United States Patent
Henry

(10) Patent No.: US 9,681,255 B2
(45) Date of Patent: Jun. 13, 2017

(54) MOBILE PROXIMITY BONDING SYSTEM AND METHOD

(71) Applicant: Juliette Henry, Coral Gables, FL (US)

(72) Inventor: Juliette Henry, Coral Gables, FL (US)

( * ) Notice: Subject to any disclaimer, the term of this patent is extended or adjusted under 35 U.S.C. 154(b) by 0 days.

(21) Appl. No.: 15/011,606

(22) Filed: Jan. 31, 2016

(65) Prior Publication Data

US 2016/0227344 A1    Aug. 4, 2016

Related U.S. Application Data

(60) Provisional application No. 62/110,447, filed on Jan. 30, 2015.

(51) Int. Cl.
| | |
|---|---|
| *H04M 3/42* | (2006.01) |
| *H04W 4/00* | (2009.01) |
| *G06F 3/0484* | (2013.01) |
| *H04L 29/08* | (2006.01) |
| *H04M 1/2745* | (2006.01) |
| *H04M 1/725* | (2006.01) |

(52) U.S. Cl.
CPC ........ *H04W 4/003* (2013.01); *G06F 3/04842* (2013.01); *H04L 67/306* (2013.01); *H04M 1/274516* (2013.01); *H04M 1/7253* (2013.01); *H04W 4/008* (2013.01); *H04M 2250/02* (2013.01)

(58) Field of Classification Search
None
See application file for complete search history.

(56) References Cited

U.S. PATENT DOCUMENTS

| | | | | |
|---|---|---|---|---|
| 8,914,024 | B2 * | 12/2014 | Alharayeri | H04W 4/02 370/310.2 |
| 2005/0250552 | A1 * | 11/2005 | Eagle | H04M 1/7253 455/567 |
| 2008/0051033 | A1 * | 2/2008 | Hymes | G06F 17/30247 455/47 |
| 2009/0209202 | A1 * | 8/2009 | Martini | H04W 12/02 455/41.2 |
| 2010/0009703 | A1 * | 1/2010 | Sornay | H04L 51/32 455/466 |
| 2011/0151890 | A1 * | 6/2011 | Platt | G06Q 10/107 455/456.1 |

(Continued)

*Primary Examiner* — German J Viana Di Prisco
(74) *Attorney, Agent, or Firm* — Malloy & Malloy, P.L.

(57) ABSTRACT

A system and method are provided for automated facilitation of a spontaneous introduction with a stranger of interest. The system may operate, for example, on handheld or wearable electronic devices. Using the system, the interested person may send a quick notification to a targeted recipient. The user will only be able to send an invitation to someone whose device is within range of the user's device, which may for example be the maximum distance or range over which the user's device is capable of transmitting a type of wireless signal, such as a Bluetooth® LowEnergy signal, both devices having the capability to send and receive that type of signal. The initial invitation may be anonymous, and an exchange of identifying information, subject to user approval, may follow in subsequent steps. The app and system may be usefully applied, for example, to facilitating romantic, friendly, or even business interpersonal introductions.

20 Claims, 25 Drawing Sheets

(56) References Cited

U.S. PATENT DOCUMENTS

| | | | |
|---|---|---|---|
| 2012/0108274 A1* | 5/2012 | Acebo Ruiz | G06Q 30/08 455/466 |
| 2014/0141720 A1* | 5/2014 | Princen | H04L 63/0407 455/41.2 |
| 2016/0028680 A1* | 1/2016 | Granville | H04L 51/32 709/206 |

* cited by examiner

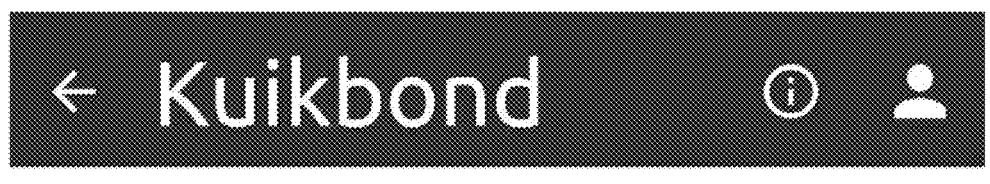
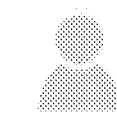 Phone A
 phonea@email.com
 All
Add to contacts
FIG. 9

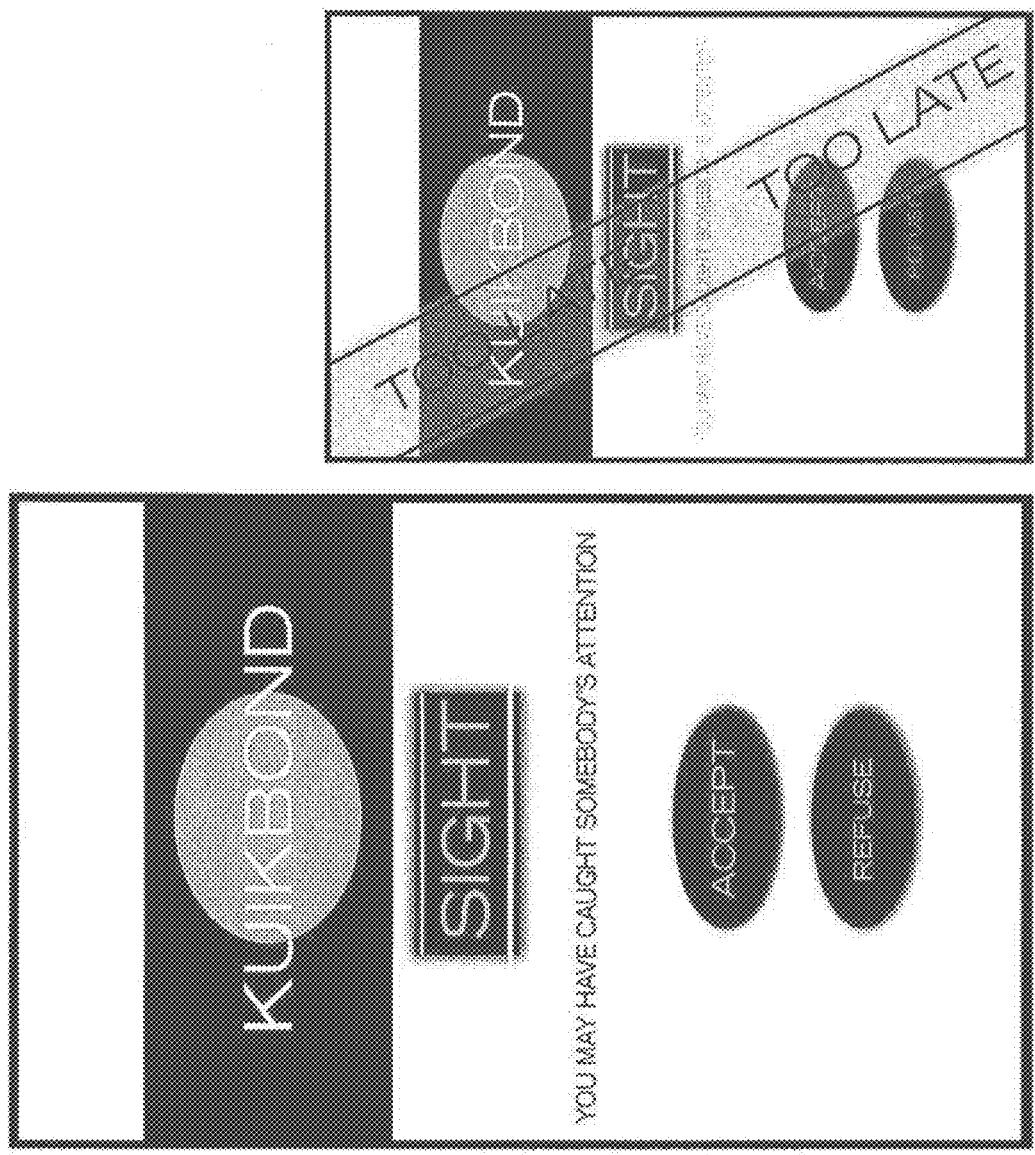

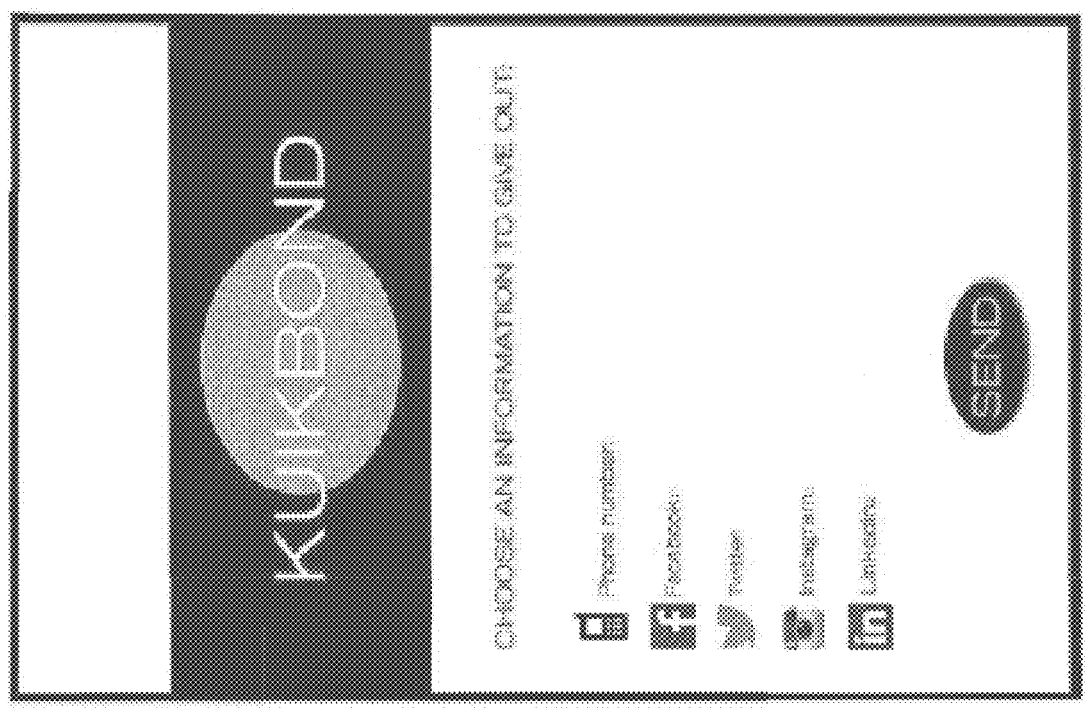

MOBILE PROXIMITY BONDING SYSTEM AND METHOD

FIELD OF THE INVENTION

This application claims the benefit of provisional application Ser. No. 62/110,447, filed Jan. 30, 2015, the entire specification of which is incorporated by reference.

The present invention relates to automated systems and methods for facilitating an interpersonal introduction. More particularly, it relates to a mobile application for facilitating a spontaneous bond between unacquainted individuals in the presence of others.

BACKGROUND

In many situations, a formal business or professional networking introduction, greeting, or friendly or flirtatious overt gesture from a stranger may be unwelcome, socially or culturally inappropriate, or simply awkward for either or both individuals involved. For example, initiating contact with another person is often difficult when it requires breaking away from one's own meeting, family gathering, or social conversation, or interrupting those of others. Thus, people often find themselves only wishing they had been able to reach out to the interesting individual they spotted when some obstacle prevented them from doing so. Aside from feeling a spark of attraction to the person, one may also notice outward signs of a common interest, such as a concert t-shirt or hat, an artist's paintbrush, a musical instrument, sports or recreational apparel or equipment, a camera, or a fashion accessory, to name but a few possibilities. A particular situation or location may also spark the desire to connect, such as when one is traveling alone and sees someone who looks like they know their way around, or just the opposite, someone who also seems to be unfamiliar with a place, who may be a good exploring companion.

A need therefore exists for a system and method of facilitating a spontaneous interpersonal interaction or bond between an individual and a stranger of interest, despite conventional obstacles.

SUMMARY OF THE INVENTION

According to one particular aspect of the invention, an interpersonal introduction mobile app is provided, being stored on an electronic device readable storage medium. The mobile app comprises a profile uploading interface for a user of the mobile electronic device to create and upload a user profile, including a user profile photograph of a user logged into the mobile app on the mobile electronic device, to a server, and coded instructions to be executed by a processor of a mobile electronic device. The coded instructions include search instructions, search response instructions, search results display instructions, invitation instructions, and invitation response instructions. The search instructions include instructions for a searching mobile electronic device to query the server for a temporary unique searching device code identifying the searching device; receive the searching device code from the server; and emit a near-field search signal including the searching device code. The search response instructions are subject to the receipt of the near-field search signal and include instructions for a nearby searched mobile electronic device running the mobile app, having received the near-field search signal, to transmit a search response signal to the server including a searched profile signature identifying a user profile of a user logged into the mobile app on the searched device and indicating that the searched device received the search signal including the searching device code. The search results display instructions are subject to receipt of a search results transmission from the server including a searched user profile photograph of a user logged into the mobile app on the searched device, and include instructions for the searching device, having received the search results transmission, to display search results including the searched user profile photograph. The invitation instructions are subject to user input to the searching device selecting the searched user pictured in the displayed search results, and include instructions for the searching device, having received the user input, to transmit an invitation signal to the server to cause the server to send an invitation notification to the searched user, accessible by the searched user when logged into the mobile app, the invitation notification including a user profile photograph of a searching user logged into the mobile app on the searching device. The invitation response instructions are subject to invitation response user input to the searched device prompted by the invitation notification, and include instructions for the searched device, having received the user input, to transmit an invitation response signal to the server to cause the server to send an invitation response to the searching user, indicating a selection by the searched user to accept or refuse the invitation from the searching user.

In one embodiment, the near-field search signal is a Bluetooth® LowEnergy signal.

In another embodiment, the search instructions are subject to user input comprising a search command.

In still another embodiment, the search instructions further comprise an instruction for the searching device to repeat periodically said emitting a near-field search signal.

In yet another embodiment, the search signal further comprises a unique signature of the app, and the search response instructions are further subject to the searched device verifying the app signature in the received search signal.

In still another embodiment, the instructions to emit the search signal further comprise an instruction to emit the search signal continuously for a predetermined search signal time and to cease emitting the search signal at the end of the search signal time. For example, the search signal time may be approximately 1 to 2 minutes.

In yet another embodiment, the invitation notification further includes a request by the searching user for a particular type of contact information from the searched user, selected by the searching user from a list of contact information type options displayed on the searching device.

In still another embodiment, said invitation response instructions are further subject to the invitation response user input being input into the searched device before the expiration of a predetermined invitation response time limit. For example, the mobile app may include an interface for said predetermined invitation response time limit to be set by a user selection input to the searching device.

According to another particular aspect of the present invention, an interpersonal introduction system is provided. The system comprises a plurality of mobile electronic devices running an interpersonal introduction mobile app stored in a medium readable by the mobile electronic devices; and a server storing a plurality of user profiles, each including a user profile photograph. In the system aspect of the invention, the app running on the mobile electronic devices may, without limitation, include any combination of elements as set forth for the app of the invention.

BRIEF DESCRIPTION OF THE DRAWINGS

FIG. 9 is a screen shot of an add-to-contacts prompt screen of an app according to the invention, displayed by the initial request receiving device.

FIG. 13 is a screen shot of an initial contact request notification screen of an alternative app according to the invention.

FIG. 14 is a screen shot of a too-late notification screen of an alternative app according to the invention, displayed by an initial request receiving device.

FIG. 19 is a screen shot of a shared information selection interface of an alternative app according to the invention, displayed by an initial request receiving device.

DETAILED DESCRIPTION OF THE INVENTION

Particular aspects and examples of systems and methods according to the invention, including but not limited to those illustrated in the accompanying drawing figures, will now be described in detail.

A preferred system of the invention incorporates a "Kuik-Bond™" mobile app for a smartphone, tablet, or other handheld device, having representative screenshots and supporting a sequence of interactive steps as illustrated in FIGS. 1-11. The system uses near-field communication signals to initiate an interaction between two users' mobile devices. The signal, such as a Bluetooth® LowEnergy signal (also termed an iBeacon® signal in Apple® iOS® devices) or a Wi-Fi signal, is generally omnidirectional and is not limited to a particular recipient. Any suitable signal type for direct user-to-user device transmissions may be supported by the app. Accordingly, any device in Bluetooth® range (and having Bluetooth® functionality enabled, if necessary) that is running the app may receive the signal References herein to "Bluetooth®," such as "Bluetooth® signal," "Bluetooth® range", and the like, are for the sake of convenience and simplicity and shall be understood to incorporate any suitable signal type capable of fulfilling the functions described herein. The present disclosure is not intended to be limiting, and may take advantage of many other capabilities of near-field communication not mentioned herein.

Figure 1:
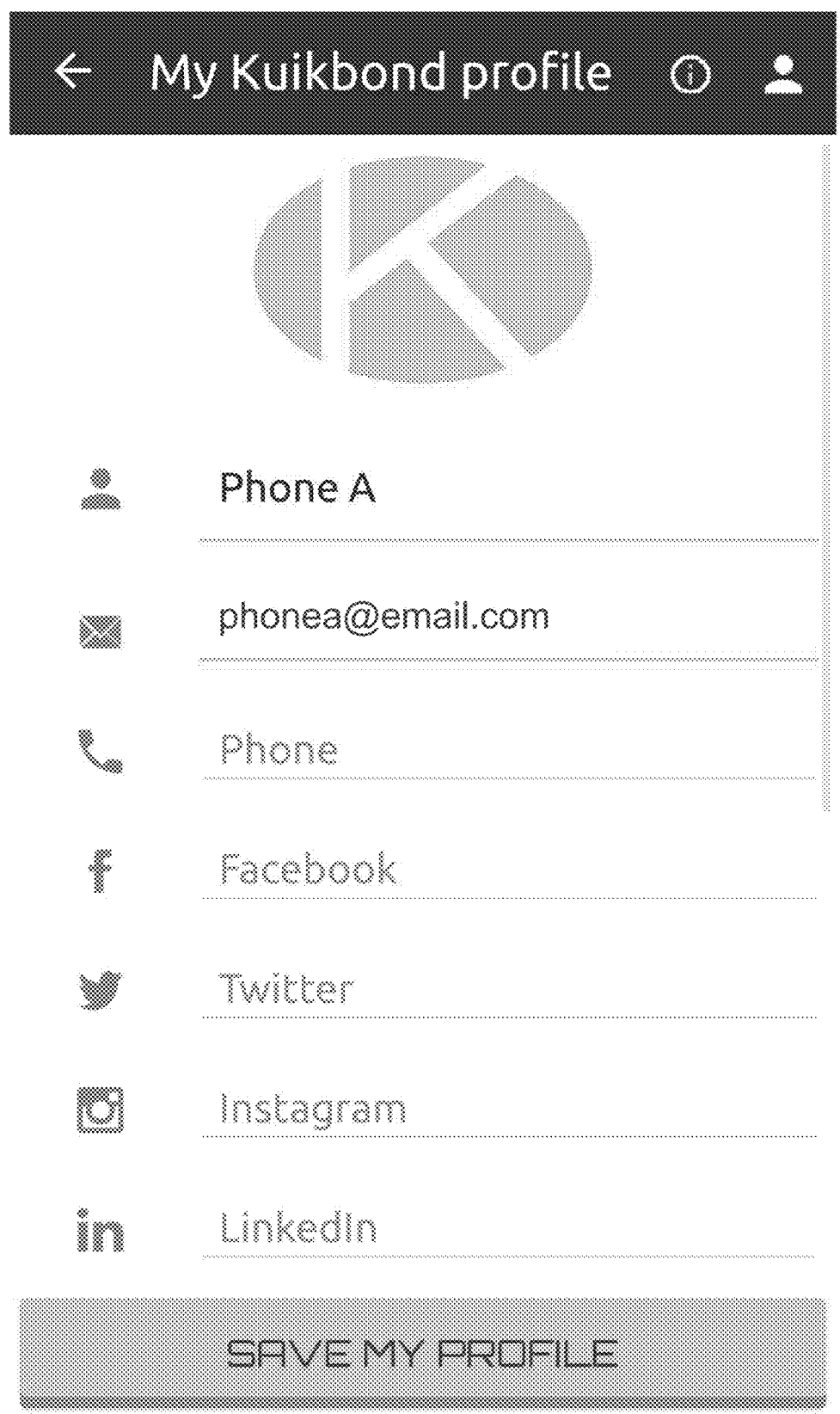
FIG. 1 is a screen shot of a profile saving screen of an app according to the invention.
Figure 2:
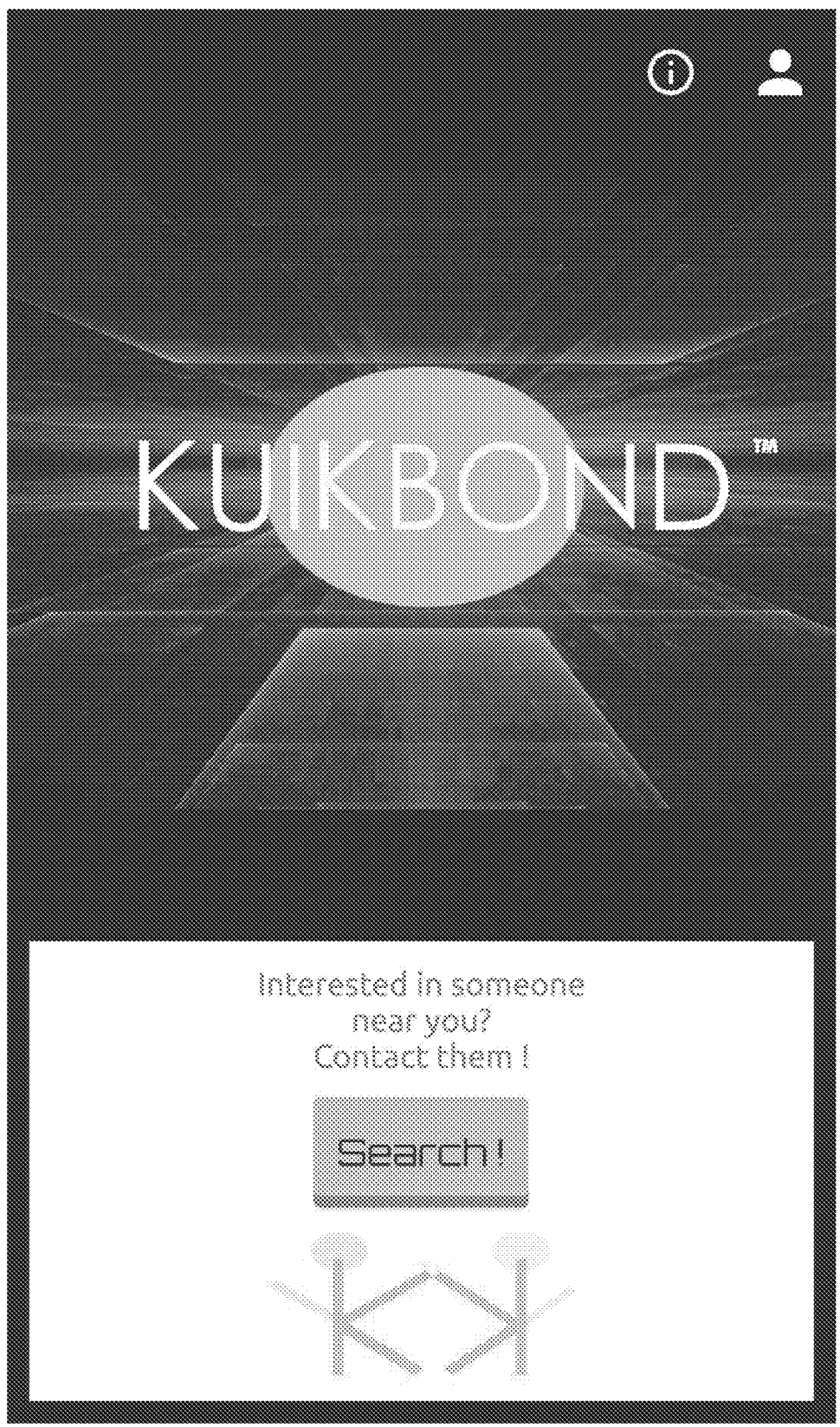
FIG. 2 is a screen shot of a search/home screen of an app according to the invention.
Figure 3:
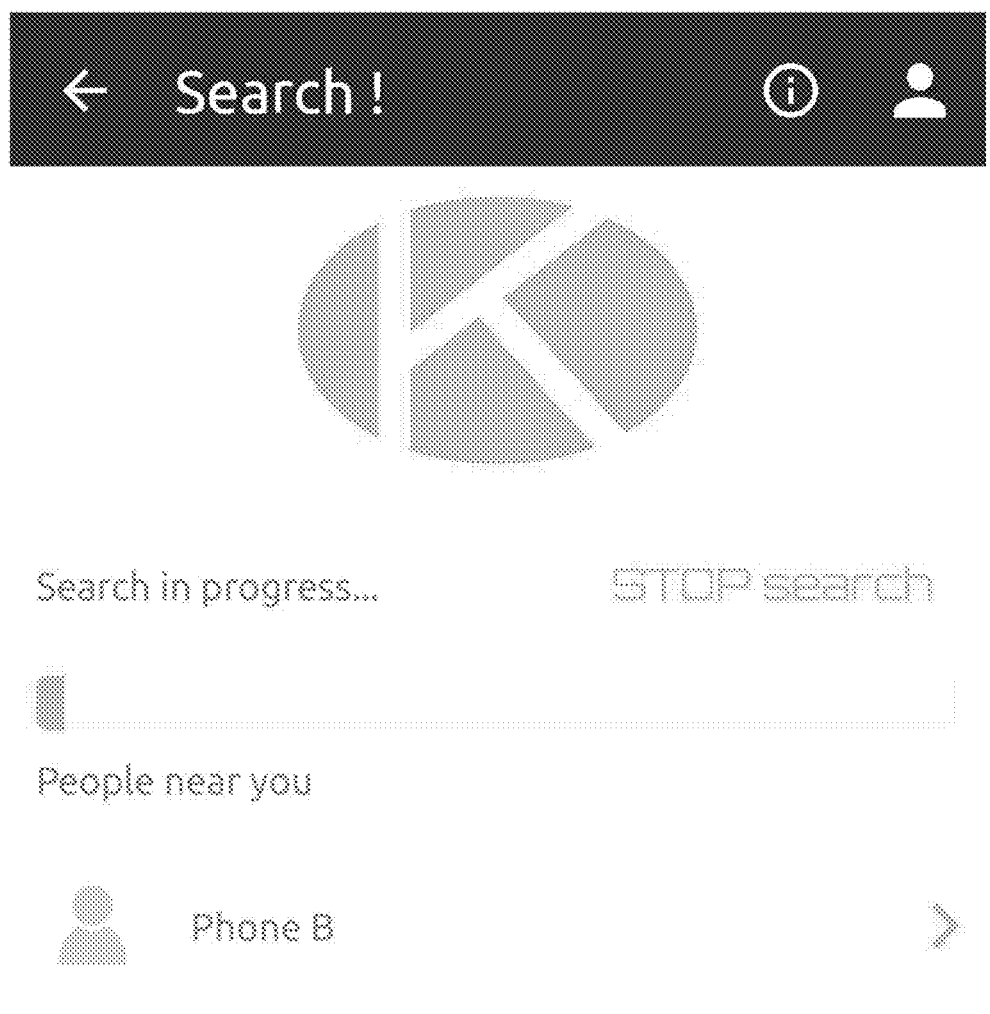
FIG. 3 is a screen shot of a search results screen of an app according to the invention.

First, a user (illustrated as a user of "phone A") creates a profile as illustrated in FIG. 1, which may include a photo/identifying image, username, and selected contact info which may include email, phone, social/professional networking media accounts, or other contact info. Next, when phone A's user is logged into the KuikBond™ app, she may spot someone in her vicinity, and search for nearby Kuik-Bond™ users by touching "Search" on the home screen shown in FIG. 2, to see whether the person she spotted also has the KuikBond™ app, and if so, to potentially initiate an introduction. A Bluetooth® signal is sent from phone A to all devices within range having Bluetooth® functionality and the KuikBond™ app enabled, and an automatic and relatively immediate response to the searching user provides her with a list of people found, identified by information preferably including a photo. The list will be populated with identified users while the search is in progress, allowing phone A's user the option of stopping the search once a user of interest has appeared in the list, as illustrated in FIG. 3. The presence of a photo (which, when provided, appears in place of the generic grey person icon shown in FIG. 3) allows phone A's user to select the user whom she spotted by sight, and/or to select other users who seem interesting to her, either by inspecting their KuikBond™ info alone, or by visually surveying the room for users who appear to be those in the list, to confirm her interest. The list may, for example, take approximately 30 to 60 seconds to populate. In the preferred embodiment, if a person is not in the list, it will not be because of any contemporaneous action by that user rejecting the initial communication from phone A, but rather only because that user does not have the KuikBond™ app, is not logged in, or does not have Bluetooth® connectivity enabled on his or her device, for example.

Figure 4:
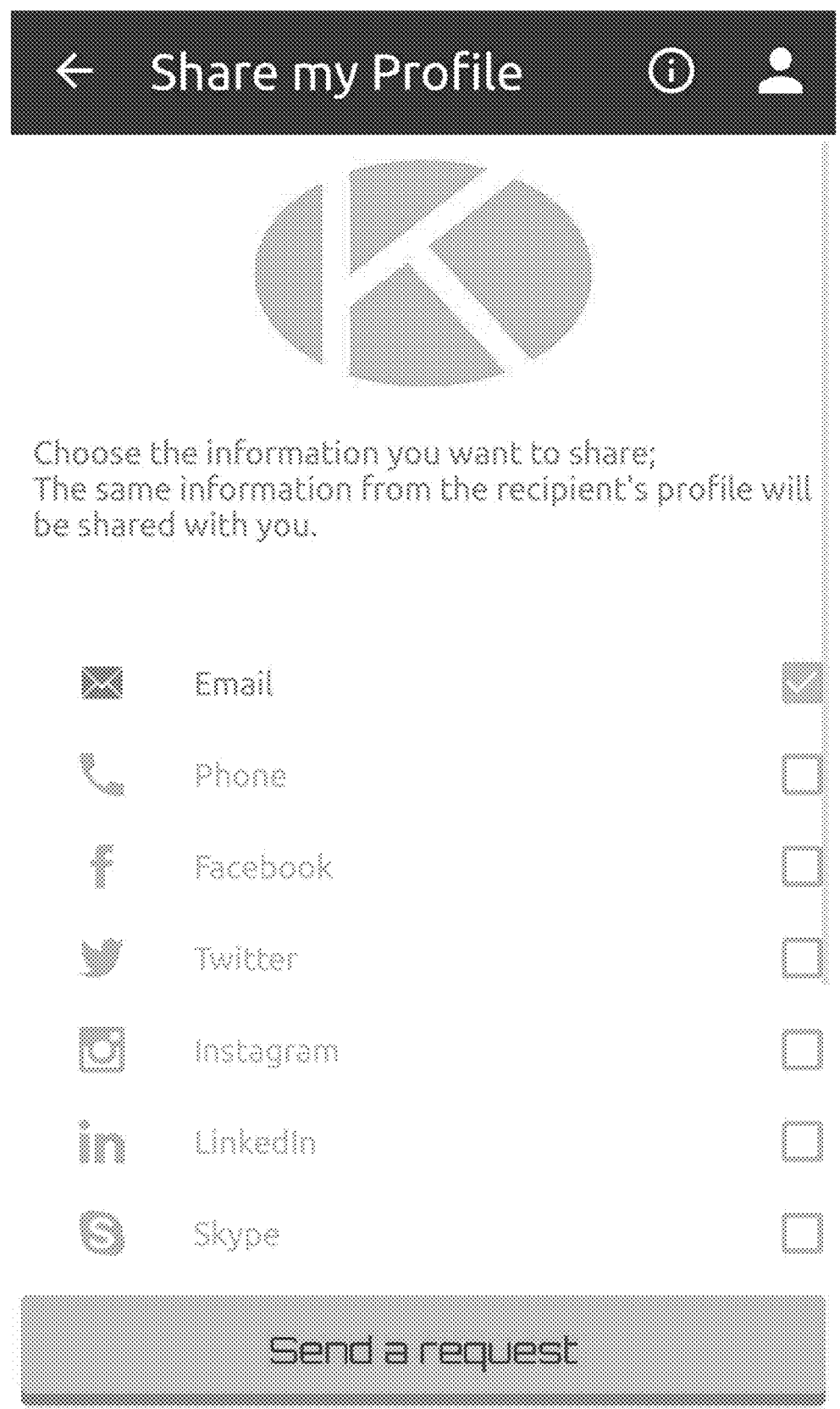
FIG. 4 is a screen shot of a shared information selection interface of an app according to the invention, for a device sending an initial contact request.
Figure 5:
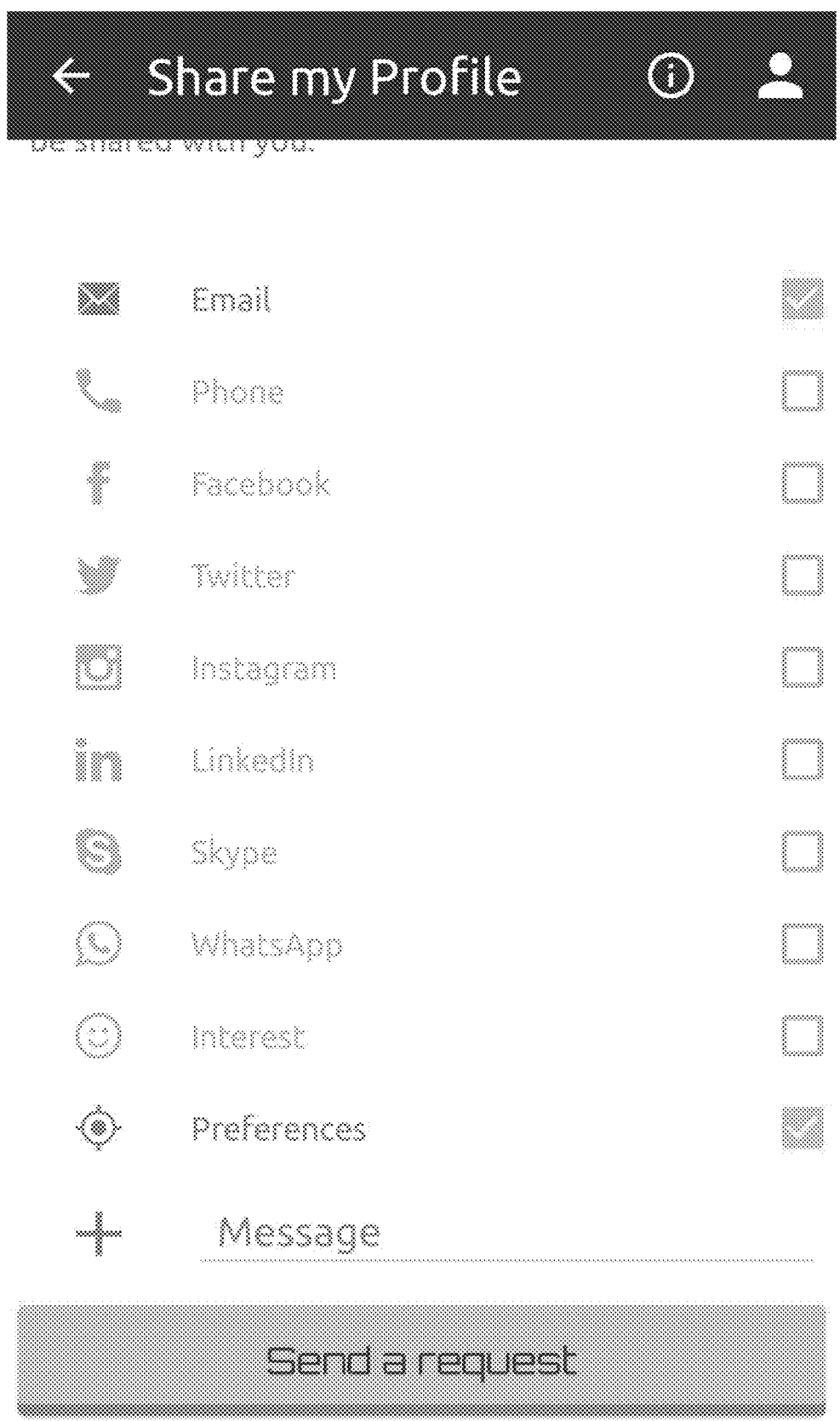
FIG. 5 is a screen shot of the shared information selection interface of FIG. 4 in a different scroll position.

Following a selection by phone A's user of a user from the list shown in the screenshot of FIG. 3 to pursue an introduction, the KuikBond™ app prompts the phone A's user to request a particular information type or types, such as from a screen interface shown at different scroll positions in FIGS. 4 and 5. These may include a phone number, email, social media profile address or information, or some other type of contact info which the user of phone A may type manually. Optionally, phone A's user's contact information of the same type(s) requested is sent (or queued to be sent upon reciprocation by the recipient) to the recipient together with the request for the recipient's information, as indicated by the message shown in FIG. 4. Preferably, the KuikBond™ app also enables her to send a free-form text message via Bluetooth® to accompany (or in lieu of) a structured request for contact info.

Figure 6:
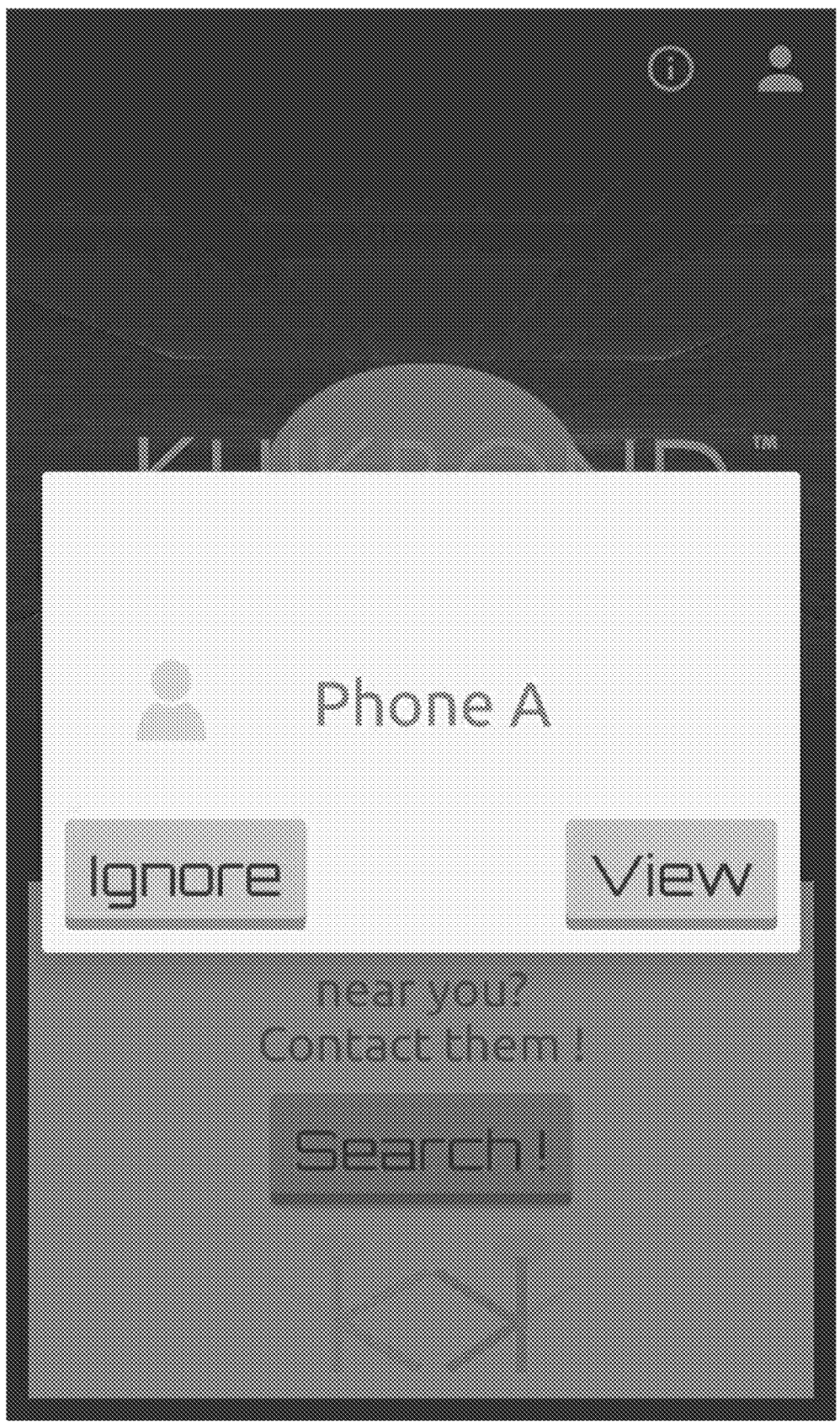
FIG. 6 is a screen shot of an initial contact request notification screen of an app according to the invention.
Figure 7:
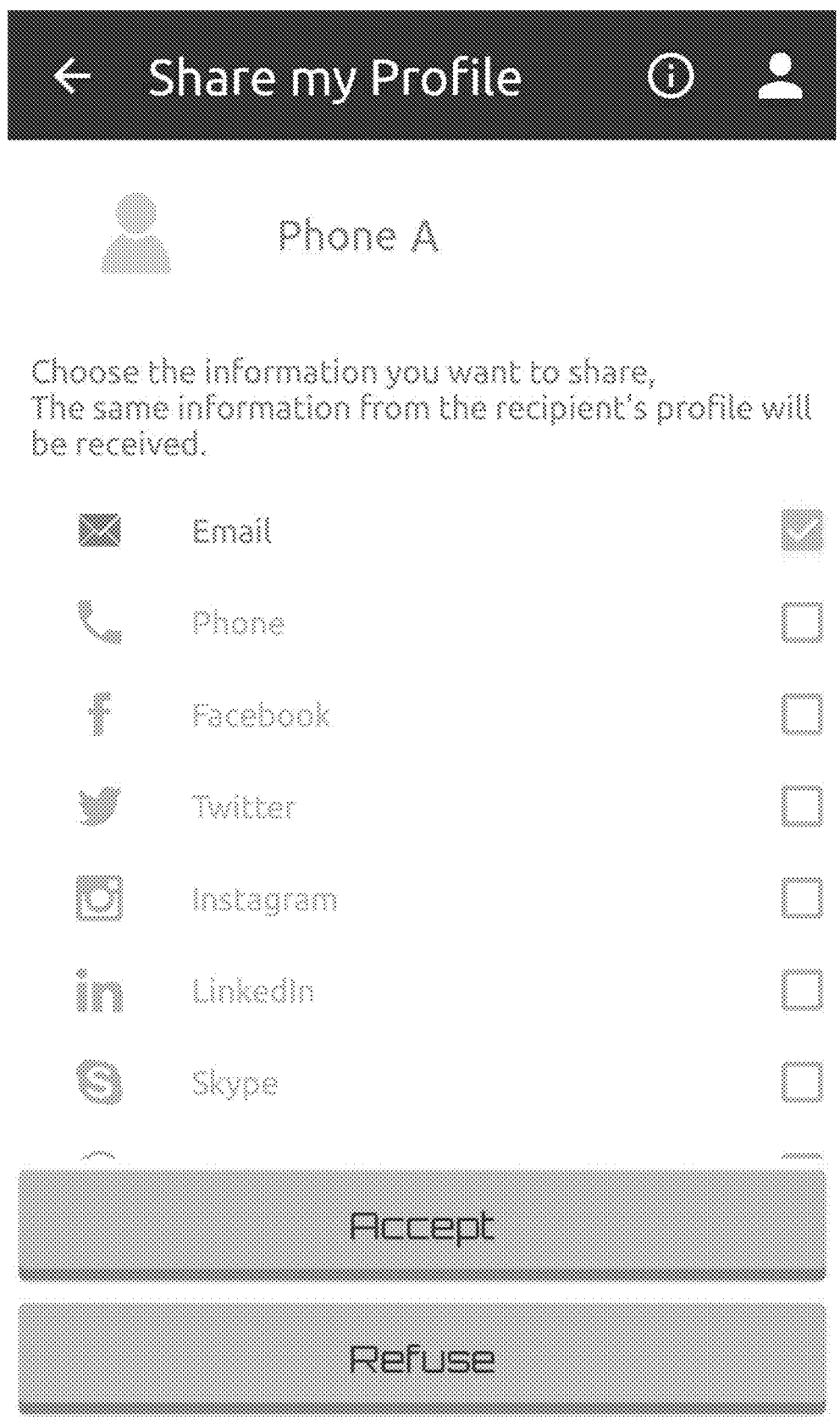
FIG. 7 is a screen shot of an accept/refuse and shared information selection interface of an app according to the invention, for a device receiving an initial contact request.
Figure 8:
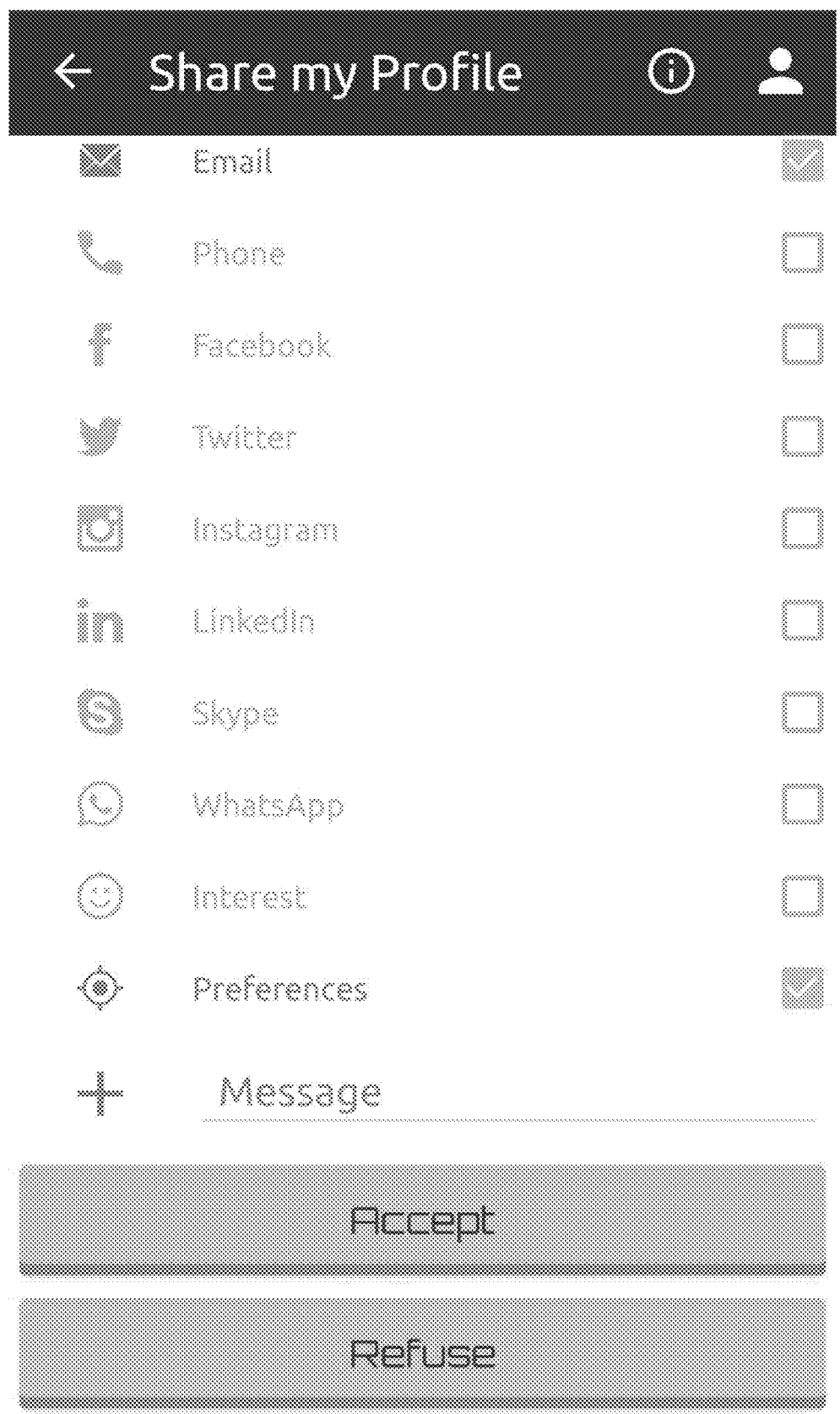
FIG. 8 is a screen shot of the interface of FIG. 7 in a different scroll position.

The recipient (illustrated as the user of "phone B") receives the request for information, seeing a screen as in FIG. 6. Upon selecting to "view" rather than "ignore" the request, he is prompted to respond to phone A, by selecting whether and which information to provide to the user of phone A (whose info and preferably photo will be displayed for the recipient) as illustrated in the screen interface shown at different scroll positions in FIGS. 7 and 8. Phone B's response is preferably sent not via Bluetooth® but via an internet connection to a remote server capable of relaying the response to phone A, regardless of phone A's proximity to the recipient or whether phone A is concurrently available to receive the response (i.e., the server will store the response so that phone A can retrieve it at a later time when he is logged in).

Figure 10:
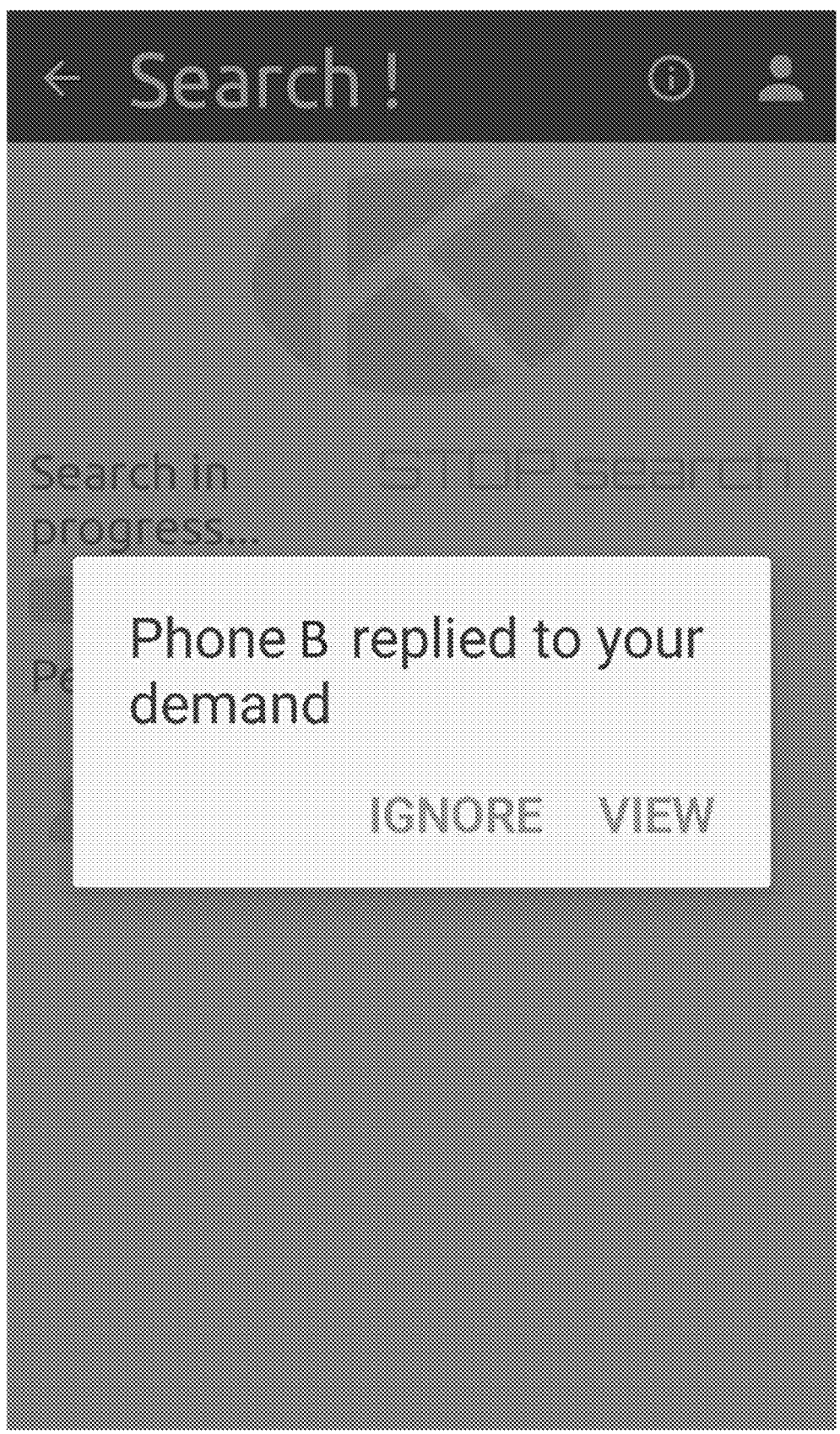
FIG. 10 is a screen shot of a reply notification screen of an app according to the invention, displayed by the initial request sending device.
Figure 11:
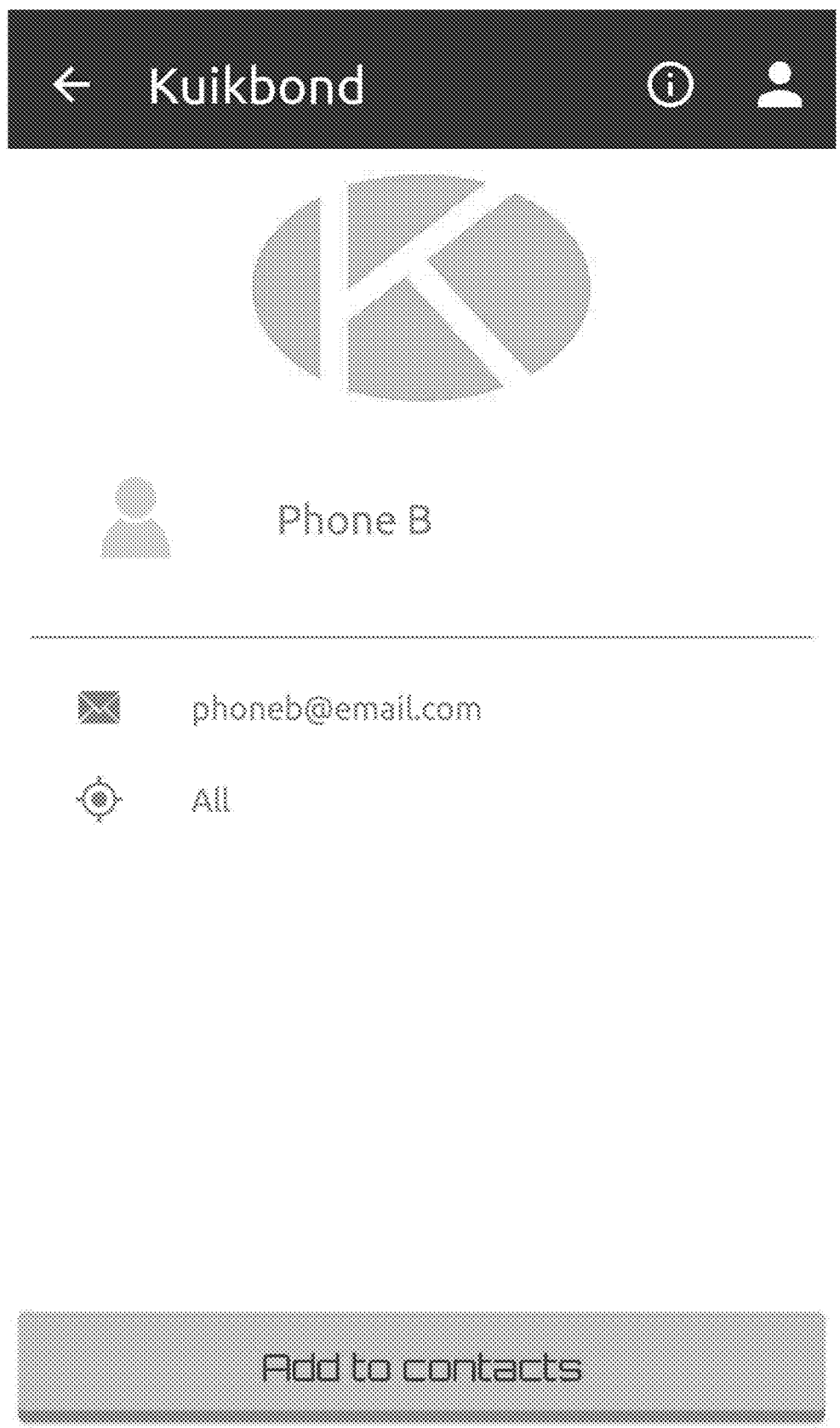
FIG. 11 is a screen shot of an add-to-contacts prompt screen of an app according to the invention, displayed by the initial request sending device.

Preferably, an arbitrary time limit, perhaps 24 hours, for example, is imposed on the recipient to respond to a sender, so that "stale" invitations about which the original sender may have forgotten or lost interest, do not lead to later awkward interactions. The mechanism of the time limit may, for example, be the expiration of a unique, temporary identification code that was requested and obtained from the server by phone A when the user of phone A pushed the "Search" button, as explained in more detail below in a discussion of the technical aspects and structural components of systems according to the invention as illustrated in FIGS. 11-17. With reference to FIG. 9, phone B's user preferably has the option to add phone A's user's contact info to his own contact list. Then, phone A's user receives a notification of phone B's response as shown in FIG. 10, and prompted whether to "ignore" or "view" it. Upon selecting to "view" phone B's reply, if phone B's user has agreed, phone A's user will similarly have the option illustrated in to add phone B's user to her contact list, as illustrated in FIG. 11. If phone B's user refused, then phone A may display a "sorry" message (not shown), or alternatively, phone A will simply not receive a notification of phone B's reply unless phone B's reply is affirmative.

One alternative system of the invention incorporates an alternative, less preferred "KuikBond™" mobile app, having representative screenshots and supporting interactive steps as illustrated in FIGS. 12-21. In general, the embodiment of FIGS. 1-11 is preferred to that of FIGS. 12-21, because the latter introduces the possibility of several users receiving an initial possible invitation, only to find out that the searching user was only interested in someone else, resulting in disappointment and/or annoyance, as will be seen below. On the other hand, the thrill of anticipation and uncertainty or ambiguity that accompanies the alternative embodiment may appeal to some users.

Figure 12:
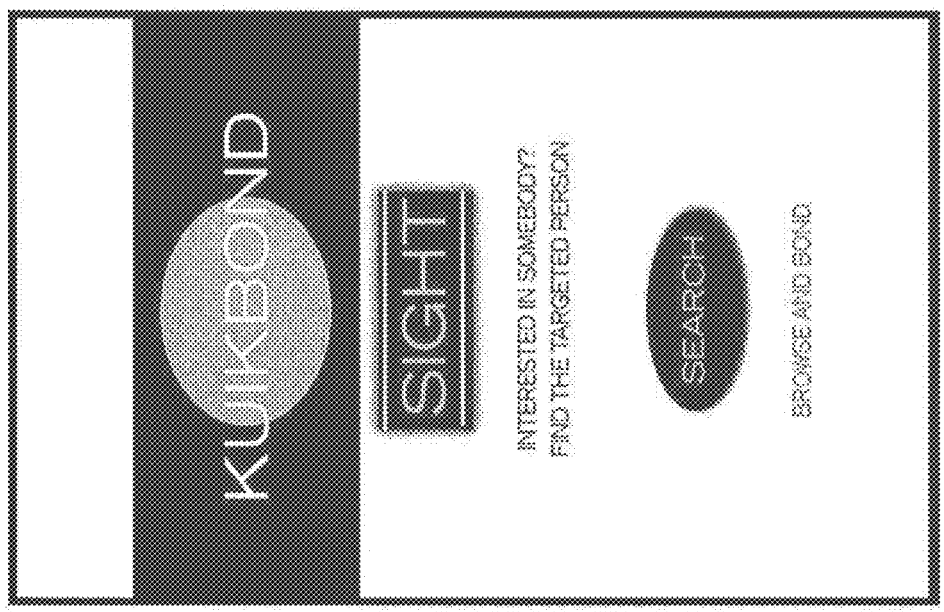
FIG. 12 is a screen shot of a home/search screen of an alternative app according to the invention.

In the alternative embodiment, when a user of the app notices someone interesting nearby, she opens the app right away to display a screen as shown in FIG. 12, and presses a "search" button to send out a signal. The signal, such as a Bluetooth® LowEnergy signal, is generally omnidirectional and is not limited to a particular recipient. Any suitable signal type for direct user-to-user device transmissions may be supported by the app. Accordingly, any device in Bluetooth® range (and having Bluetooth® functionality enabled, if necessary) that is running the app may receive the signal and display or sound an alert or notification of the received invitation, possibly including a small pop-up image of the KuikBond™ logo.

If uninterested, the recipient may drag the pop-up logo to a particular location on the device screen, such as a "trash" icon, at any time to clear the logo from the screen. Alternatively, the recipient user or users may touch the pop-up logo to open the app, see a screen like that shown in FIG. 13, and touch a selection to "accept" or "refuse" an invitation to connect from a sender. The sender may be completely anonymous at this stage as in FIG. 13, or alternatively the screen shown in FIG. 13 may further include a photo, text, or other image identifying or indicating something about the sender, or even a message composed or selected by the sender. If the recipient accepts the invitation, the recipient and/or the sender may receive further information about the proposed interaction. Alternatively, if the recipient refuses the invitation, no further information about the request will be transmitted or received by or from the sender or recipient device. Optionally, the recipient may also choose to have the app block/ignore (or the app may automatically block/ignore, whether as a built-in immutable function or as a user preference/setting) any future transmissions from the same sender device.

Optionally, the first response from the recipient to the sender may be via the same type of near-field communication signal used to transmit the invitation from the sender. In that case, it may become "too late" for the recipient to respond to the sender's invitation if the recipient moves out of the sender's range or vice-versa, and the recipient may be presented a screen like that shown in FIG. 14. More preferably, the app platform allows the recipient to respond by relaying a message through a remotely located server as in the FIG. 1-11 embodiment, and an arbitrary time limit is instead imposed on the recipient to respond to a sender and have the server relay the message to the sender.

Figure 16:
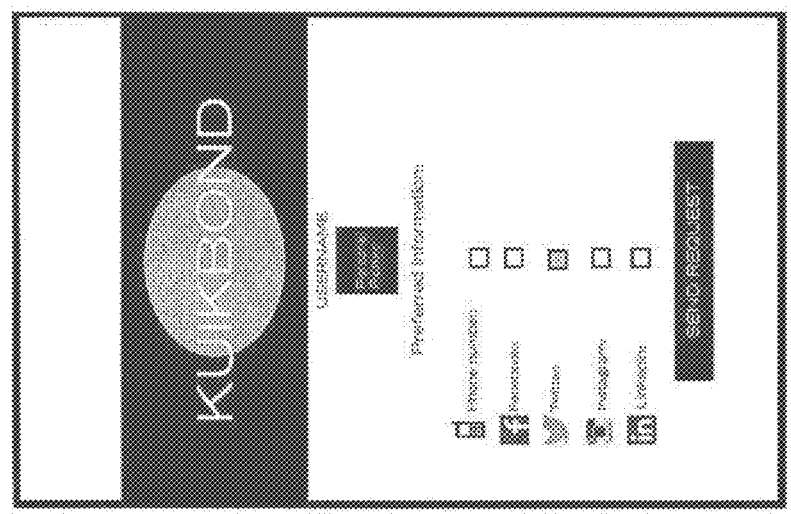
FIG. 16 is a screen shot of a shared information selection interface of an alternative app according to the invention, displayed by an initial request sending device.
Figure 15:
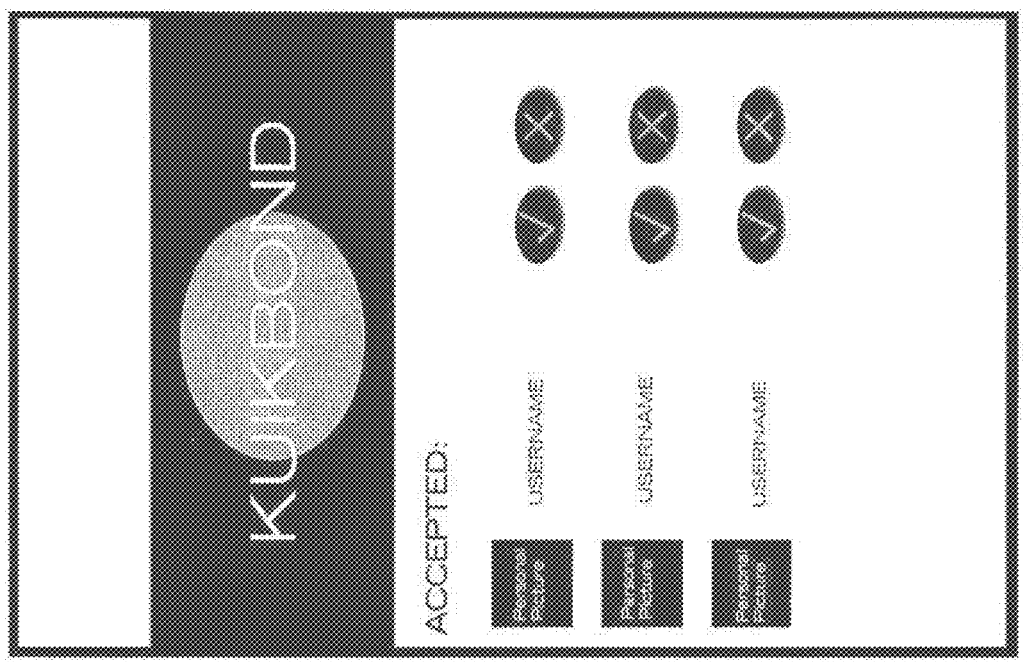
FIG. 15 is a screen shot of an initial contact acceptance notification screen of an alternative app according to the invention, displayed by an initial request sending device.

The sender will then get a response including identifying information from any recipient user who accepted her alert. For example, the sender may receive a username and/or a photo of each responding recipient (preferably, the sender will at least receive a photo, as a username will not likely enable the sender to confirm the identity of the person she spotted). Upon reviewing the identifying information, the sender will determine which, if any, of the responders she is interested in contacting, and select from a menu screen such as that shown in FIG. 15 whether to "confirm" the responder and continue the introduction process. Upon confirming a responder, the sender is then prompted by screen such as shown in FIG. 16 to select which, if any, further information she desires from the responder in question, from a list which may include, for example, a phone number; Facebook®, Twitter®, Instagram®, LinkedIn®, Pinterest®, or other social media profile information; and an "other" category to be manually entered by a sender who selects "other".

Figure 18:
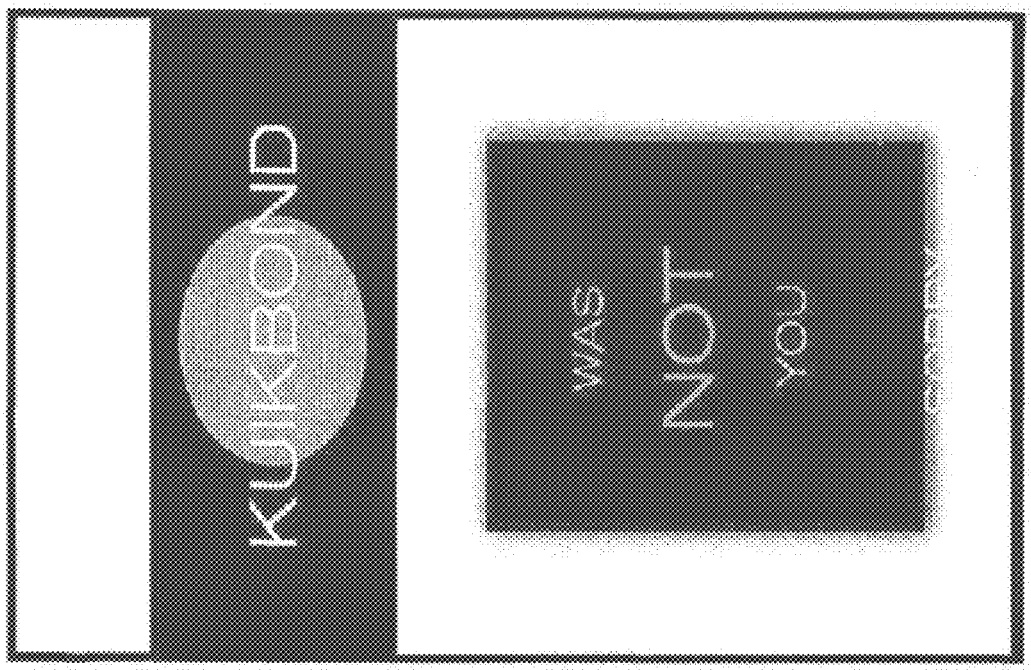
FIG. 18 is a screen shot of a "was not you—sorry" notification screen of an alternative app according to the invention, displayed by an initial request receiving device.
Figure 17:
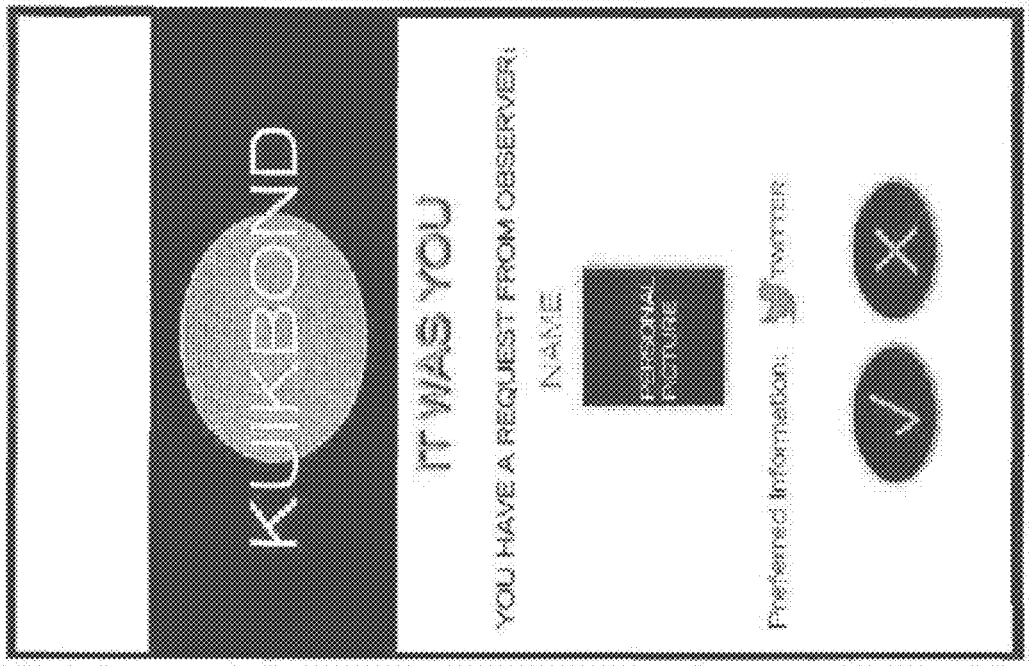
FIG. 17 is a screen shot of an it-was-you notification screen of an alternative app according to the invention, displayed by an initial request receiving device.

After the sender confirms or denies each responder, the responder will receive one of the screen images shown in FIGS. 17 and 18, respectively, indicating whether the sender requests further contact. If the sender confirmed the responder, the screen shot may include a message suggesting that the responder was "the one" initially sought by the sender such as "IT WAS YOU" as in FIG. 17, or it may simply indicate that the sender is still interested in communicating; otherwise, the responder will receive a "WAS NOT YOU/SORRY" message as in FIG. 18. In some cases, the sender may "confirm" a responder who was not the person she originally spotted, or even confirm multiple responders, with or without revealing to any of the responders that multiple responders were confirmed. For example, she may have spotted multiple people she found interesting, found someone more or less interesting upon receiving a response than when she initially surveyed the crowd, or spotted no one in particular but simply wished to cast a net to her surroundings to see who would respond. The app may permit sending an "IT WAS YOU" message to multiple responders, or alternatively, it may permit sending an "IT WAS YOU" message to only one responder.

The "IT WAS YOU" screenshot, or other confirmation screenshot, provides the confirmed responder with information identifying the sender, such as the sender's photo and/or username, and again prompts the responder to accept or reject the sender's invitation to connect, now that the responder has the identifying information. If the responder accepts, the responder will then receive a screenshot such as shown in FIG. 19, prompting the responder to choose contact information to provide to the sender. The responder may be limited to selecting information of only one type, or he may provide more than one type. In either case, the responder is preferably enabled to follow or ignore the sender's indicated preference.

Figure 20:
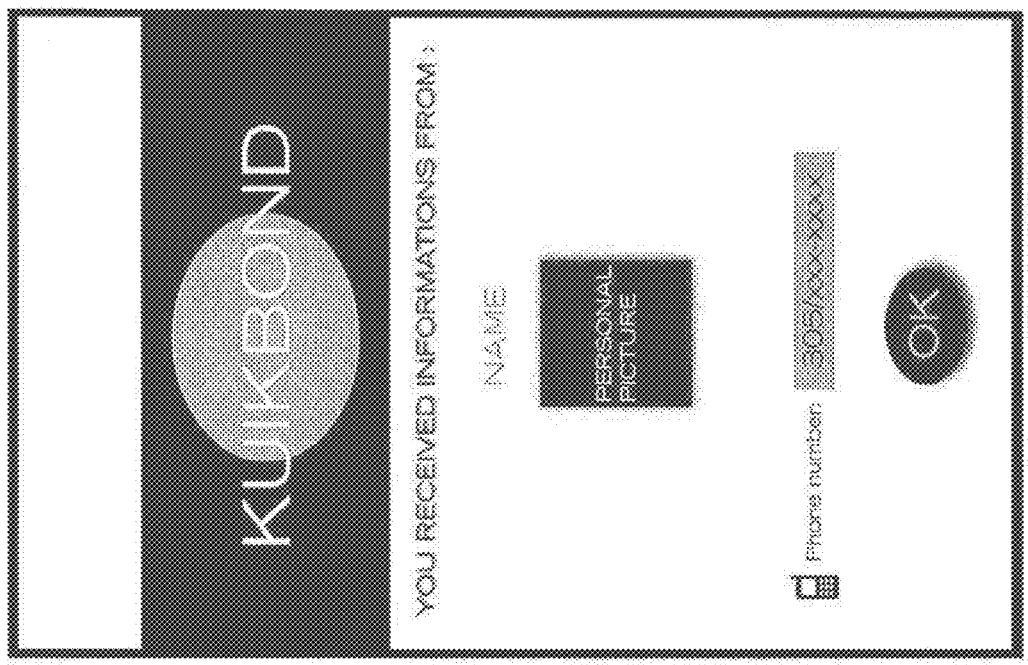
FIG. 20 is a screen shot of an information receipt notification screen of an alternative app according to the invention, displayed by an initial request sending device.

Finally, the sender receives the contact information selected by the responder, illustrated in FIG. 20 as a phone number. The sender is prompted to acknowledge receipt of the contact information, for example by touching/clicking "OK", upon which all traces of the connection between the sender and responder are erased, at least from the app server. Optionally, to prevent inadvertent deletion and loss of the received contact info by the sender, the contact info may remain stored in a local memory of the sender's device.

Figure 21:
FIG. 21 is a screen shot of a profile editing home page of an alternative app according to the invention.

Turning to FIG. 21, a "home page" screenshot of the app is illustrated. From this screen, a user may change his photo, username, password, and other personal identifying or contact information. The "Browse" box may be touched/clicked to start searching for a nearby person. Optionally, the home page may also provide a way for the app administrator to collect data of interest on app users, such as a "question of the week" button, for example, which may prompt the user to provide, for example, the name of a country he or she dreams of visiting. A "question of the week" button is merely intended to be illustrative—the frequency may be random or some other time period, and the data sought may be of a different nature.

Referring to FIGS. 22-28, the technical structure and function of a system 10 of the invention will now be described in greater detail. Some details of the captions of these figures apply to the alternative embodiment whose screenshots are shown in FIGS. 12-21 as described above, but the infrastructure and devices illustrated are capable of supporting the preferred and alternative illustrated embodiments, as well as many other embodiments of the invention.

Figure 22:
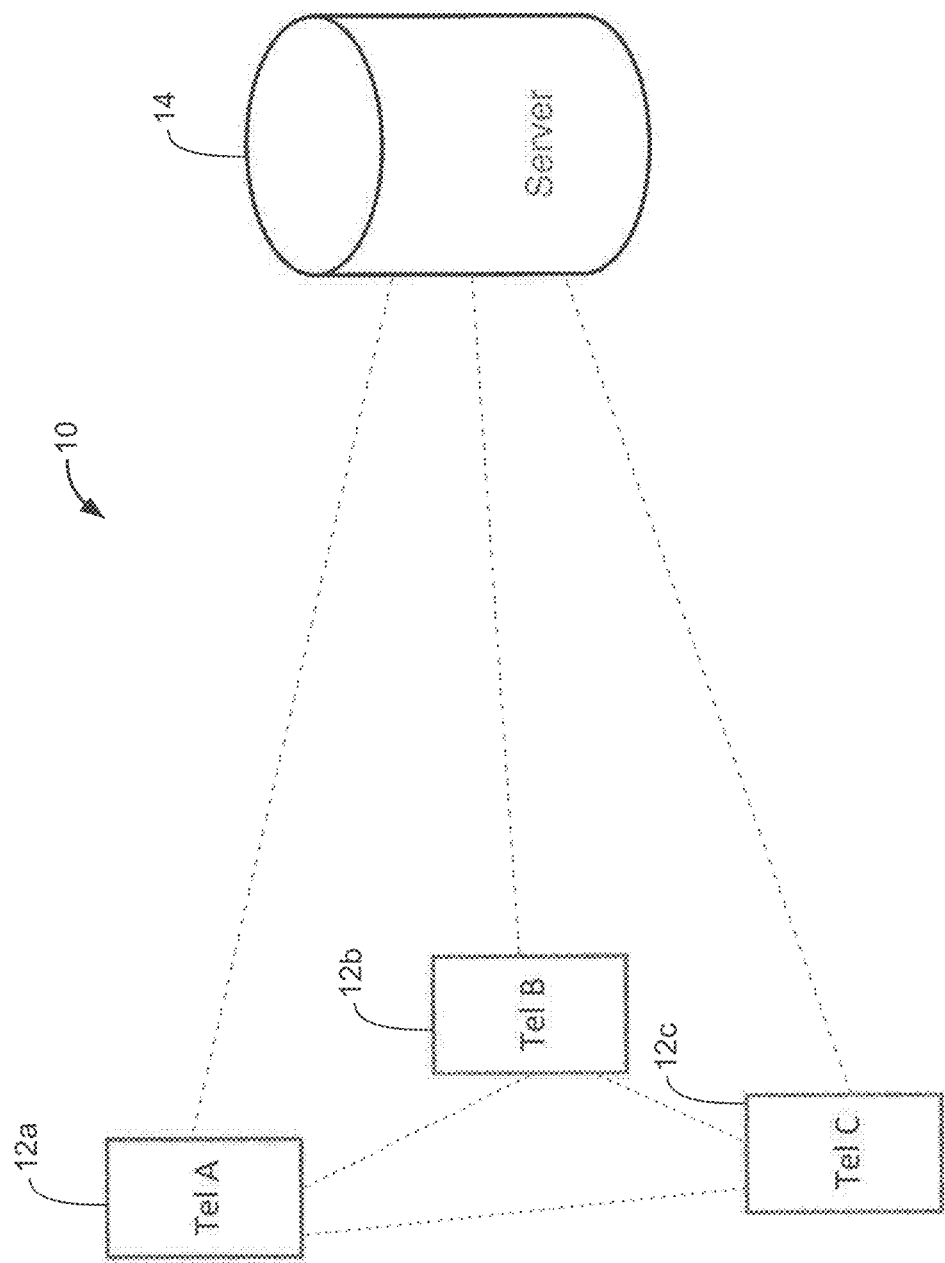
FIG. 22 is a schematic illustration of a system according to the invention depicting a server and a plurality of user devices in waiting states.
Figure 23:
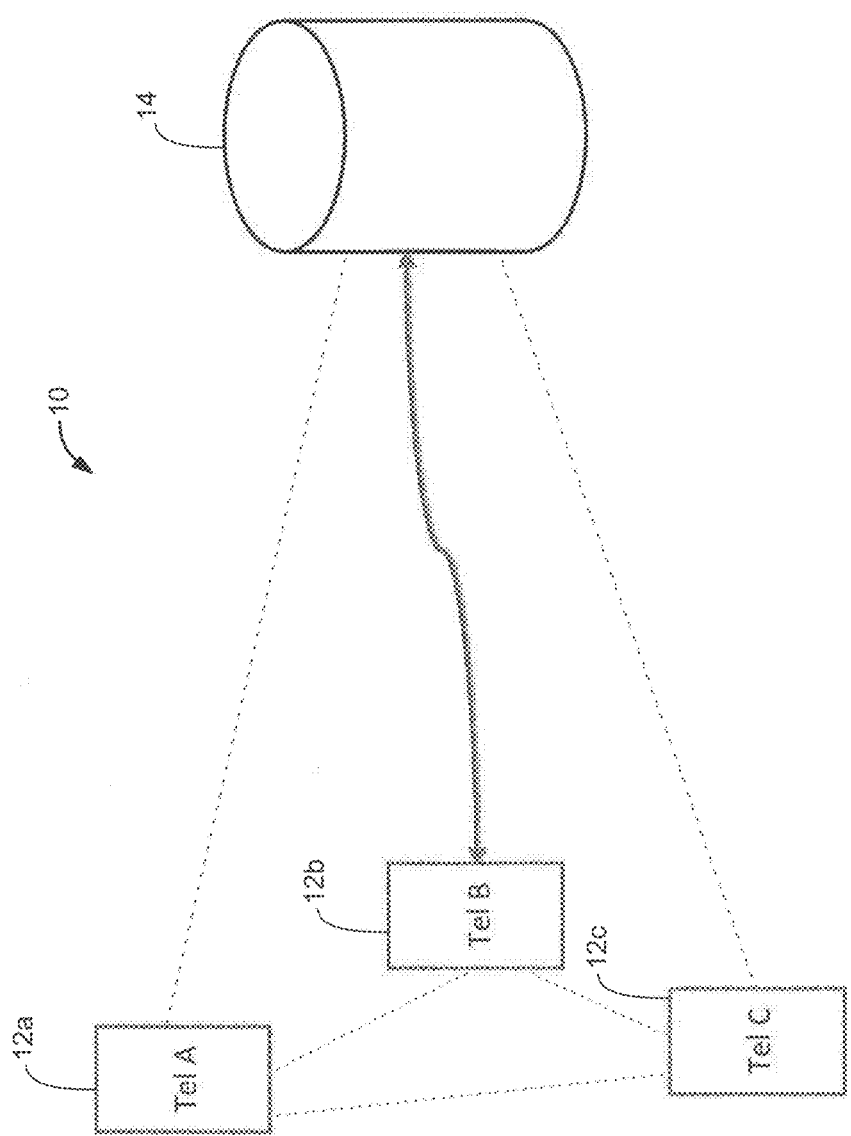
FIG. 23 is a schematic illustration of the system shown in FIG. 22, depicting one of a plurality of user devices interacting with a server to enter an emitting mode.

In FIG. 22, system 10 is shown to include mobile devices/phones 12a, 12b and 12c in close proximity to one another and remotely located from a server 14. Phones 12a-12c are illustrated in a waiting or "listening" mode. In FIG. 23, phone 12b enters an emitting mode by requesting and receiving a unique signal code from a server, by way of transmitting any suitable data signal, through appropriate transmission structure which may include, without limitation, radio or other wave transmitters and receivers; electric data cables, telephone cables, or power transmission lines; fiberoptic cables; cellular towers; satellites; intermediate servers or other relaying devices; and any other suitable infrastructure for transmitting the data signal. This step may apply to both illustrated embodiments.

Figure 24:
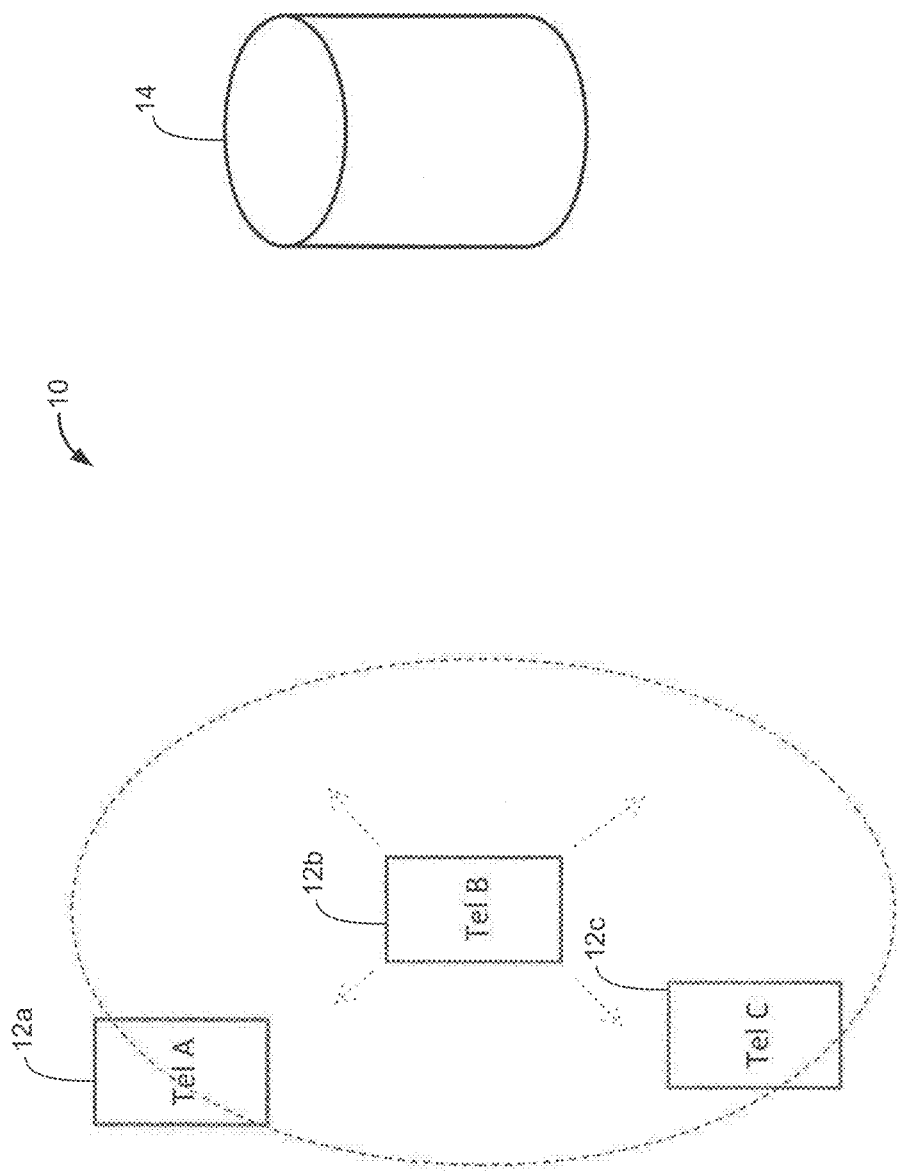
FIG. 24 is a schematic illustration of the system shown in FIG. 22, depicting one of a plurality of user devices spreading a near field search signal to other user devices within signal range.
Figure 25:
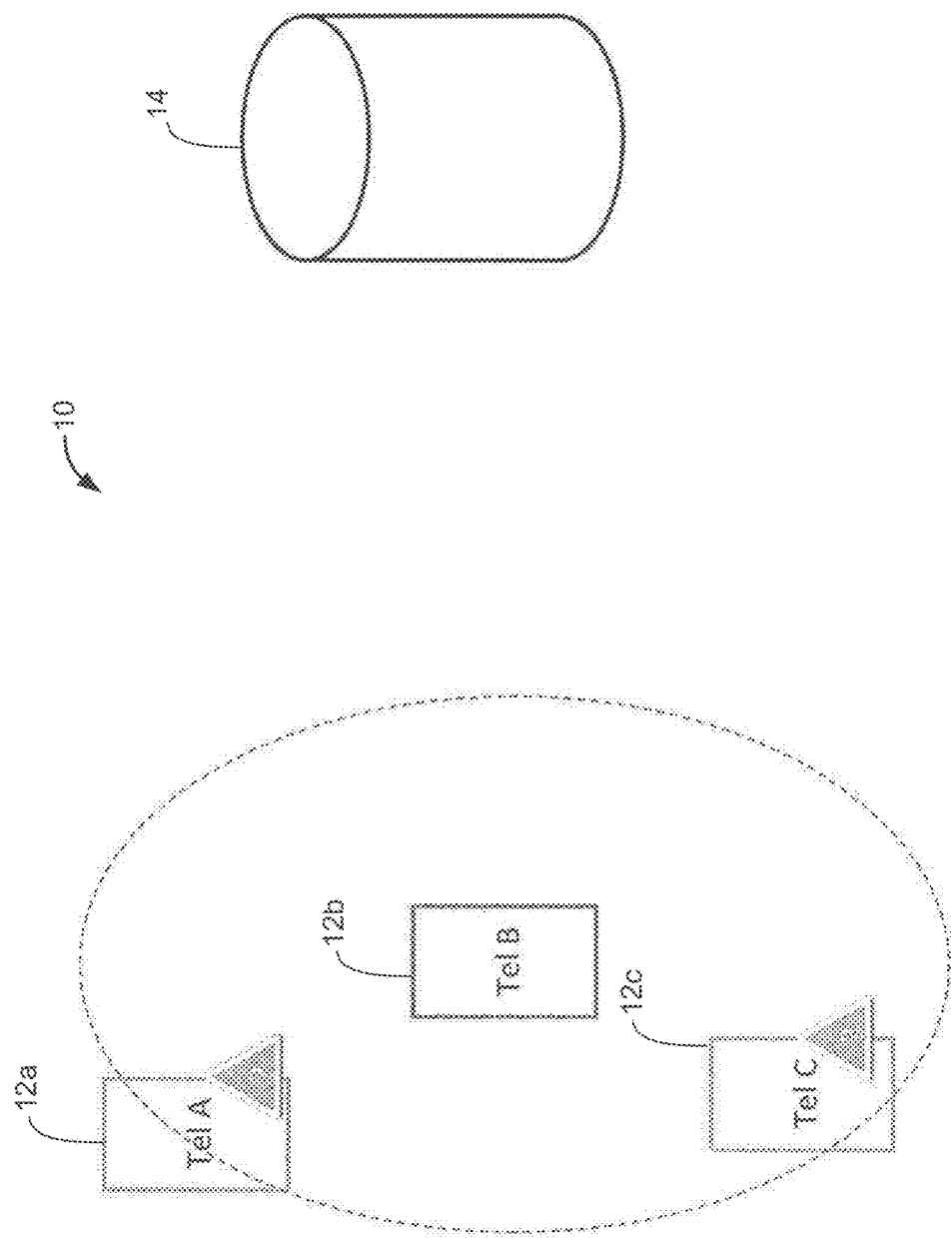
FIG. 25 is a schematic illustration of the system shown in FIG. 22, depicting two user devices receiving the search signal shown emitted in FIG. 24.

Turning to FIG. 24, having received the unique signal code, phone 12b then sends/spreads the code, such as by emitting a Bluetooth® LowEnergy or other "near-field" signal. Phones 12a and 12c are shown to be within phone B's Bluetooth® range, as depicted by the dashed oval. As shown in FIG. 25, phones 12a and 12c receive the signal. In the preferred embodiment, phones 12a and 12c both automatically respond to phone 12b to populate a list of nearby users including a photo of each user and/or other identifying information. Phones 12a and 12c may respond to phone 12b through the server that provided the unique signal code to phone 12b, such as by transmitting a request to the server to relay profile information to the device associated with the unique signal code, which the server identifies as phone 12b. Alternatively, phones 12a and 12c may respond to phone 12b by transmitting an omnidirectional near-field signal including profile information and tagged with phone B's unique signal code, each phone running the app being programmed to accept such a transmission of profile information only if the signal code tag corresponds to its own unique signal code. In this manner, the transmissions from phones 12a and 12c will result in them sharing user profile information only with phone 12b, and not with each other.

Figure 26:
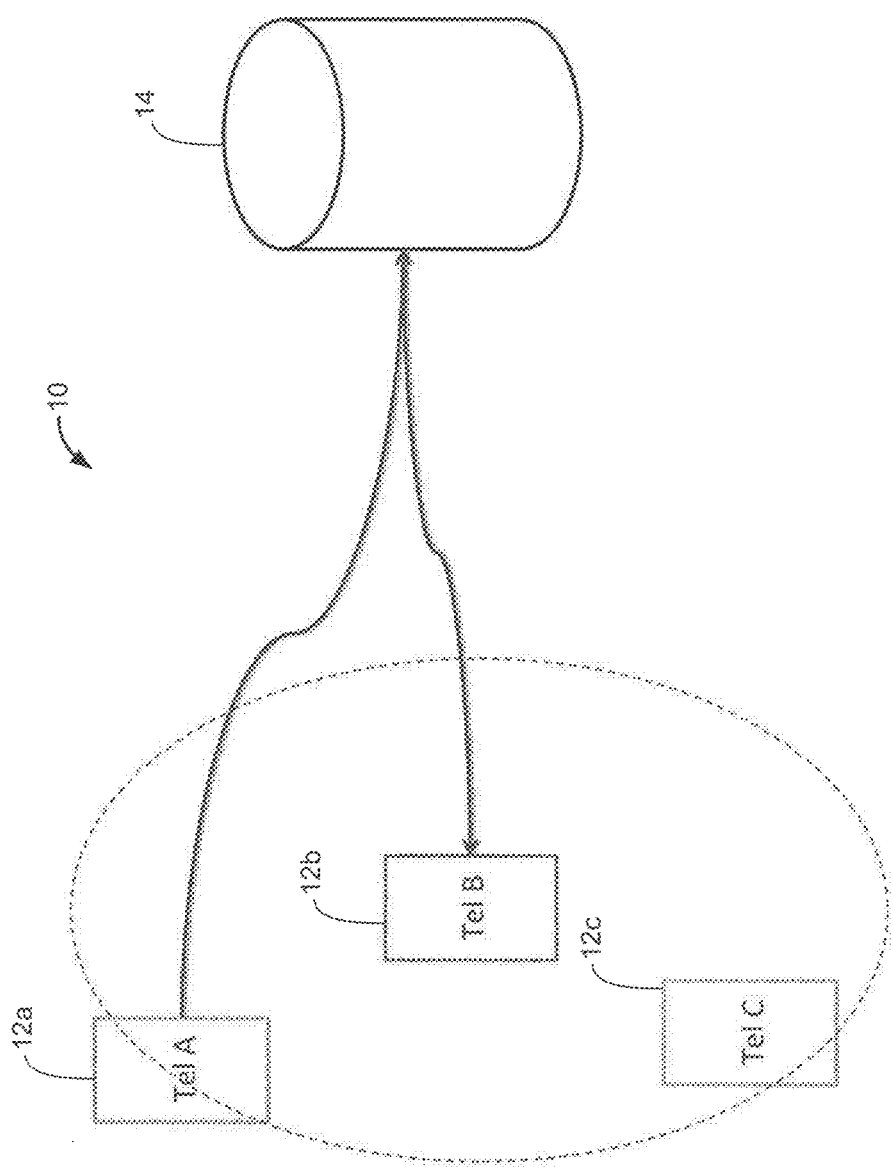
FIG. 26 is a schematic illustration of the system shown in FIG. 22, depicting one user device interacting with the server to accept the communication of profile information from the device emitting the signal in FIG. 24.

In the alternative embodiment, this is the stage at which a notification appears prompting the respective users to accept or reject an invitation to connect to an unidentified sender (phone 12b). Although phones 12a and 12c receive the signal code transmitted by phone 12b, they do not receive any information identifying or associated with phone 12b or the user of phone 12b; rather, the association between the unique signal code and phone 12b is stored only in the server, so that phone 12b is anonymous to phones 12a and 12c. As illustrated in FIG. 26, phone 12a accepts the invitation by sending a signal to the server, which transmits information to phone 12b including a photo and username of the user of phone 12a. Phone 12c refuses the invitation, and no further interaction occurs between phones 12b and 12c.

Figure 27:
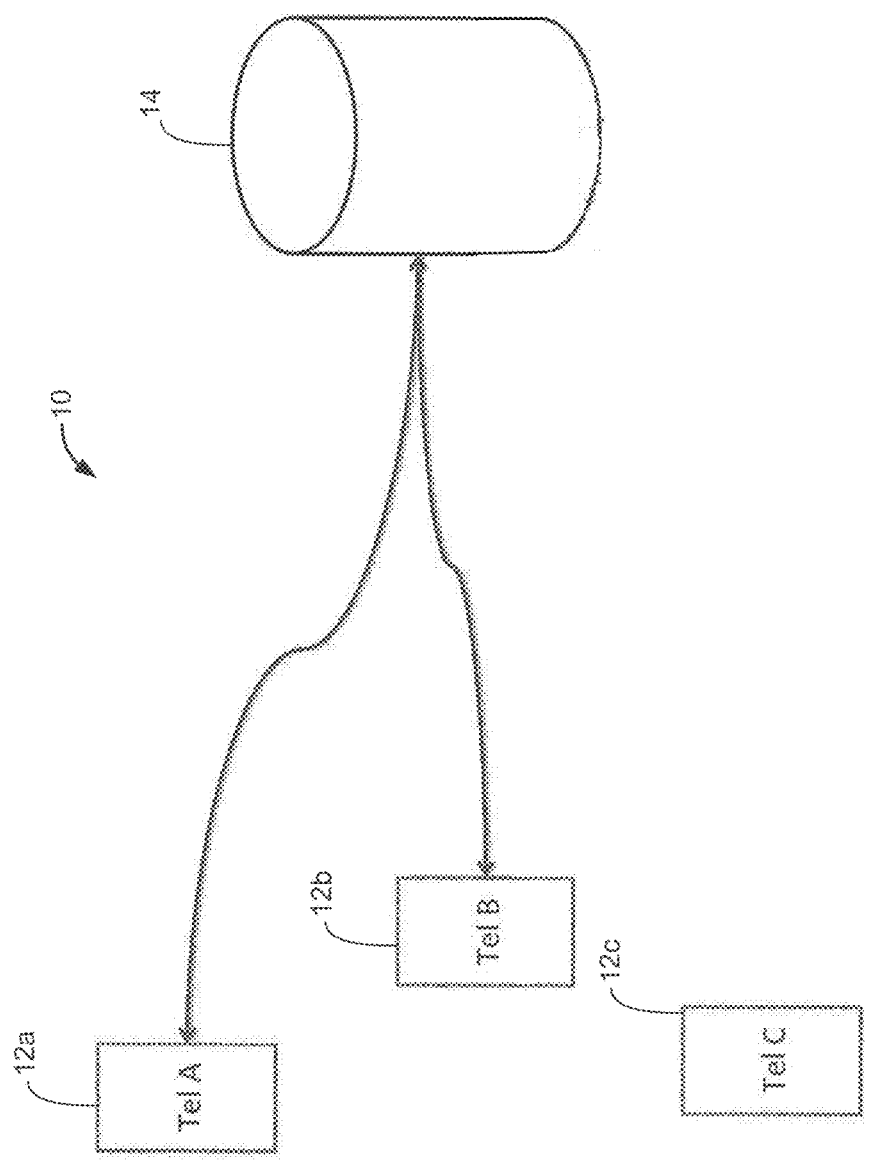
FIG. 27 is a schematic illustration of the system shown in FIG. 22, depicting the initial sending device sharing profile information with the profile information accepting device via the server.
Figure 28:
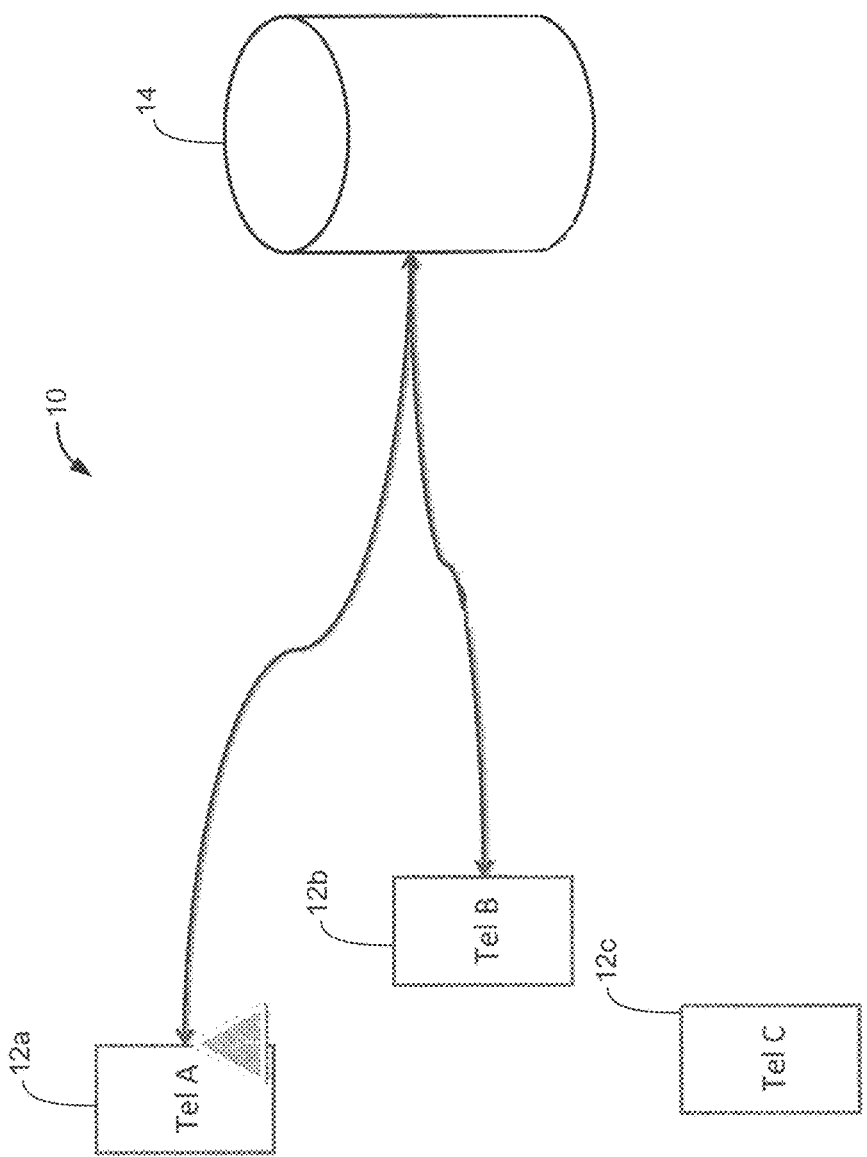
FIG. 28 is a schematic illustration of the system shown in FIG. 22, depicting the initial sending device receiving via the server an indication of whether the profile information accepting device agrees to exchange contact information and communicate further through other channels.

Turning to FIG. 27, it is illustrated that, in the alternative embodiment, as soon as phone 12b receives the response from phone 12a, any subsequent communications between phones 12b and 12a are preferably relayed through the server (if not sooner, as in the preferred embodiment and in one version of the alternative embodiment mentioned above), rather than being transmitted via the Bluetooth® or similar direct signal. This not only conserves the batteries of phone 12a and phone 12b, but also enables phones 12a and 12b to continue the connection process even if the phones have moved out of each other's Bluetooth® range. Having received the answer from phone 12*a,* phone 12*b* confirms the connection and sends a further response to phone 12*a* including a username and photo. Additionally, although not shown, a phone D corresponding to a person that phone 12*b* was not looking for may have sent a response, and phone 12*b* may respond by denying the connection to phone D, so that phone D receives a message that it was not him phone 12*b* was looking for. Finally, as illustrated in FIG. 28, a new alert then comes to phone 12*b* to let its user know whether phone 12*a* accepted or refused further communication having received phone B's username and photo, and if further communication was accepted, providing phone 12*b* with contact information for phone A's user. This concludes all communication through the "KuikBond™" app.

In the preferred embodiment illustrated in FIGS. 1-11, the alternative embodiment illustrated in FIGS. 12-21, and other embodiments within the scope and spirit of the invention, in the event that any user decides to refuse or terminate the communication process with another user, the app should include automatic measures to protect the privacy and security of both users. For example, the search signal or ping of the preferred embodiment, and the initial invitation of the alternative embodiment, should in any event convey no information to detected users or recipients identifying the sender or the sender's user account or device. Additionally, upon either person/phone terminating the interaction, all record of previous interaction between the users' devices will be erased, ceasing to exist in any form, as an added privacy and security precaution.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An interpersonal introduction mobile app stored on an non-transitory electronic device readable storage medium, the mobile app comprising:
   a profile uploading interface for a user of the mobile electronic device to create and upload a user profile, including a user profile photograph of a user logged into the mobile app on the mobile electronic device, to a server;
   search instructions for a searching mobile electronic device to:
      query the server for a temporary unique searching device code identifying the searching device;
      receive the searching device code from the server; and
      emit a near-field search signal including the searching device code;
   search response instructions, subject to receipt of the near-field search signal, for a nearby searched mobile electronic device running the mobile app to:
      transmit a search response signal to the server including a searched profile signature identifying a user profile of a user logged into the mobile app on the searched device and indicating that the searched device received the search signal including the searching device code;
   search results display instructions, subject to receipt of a search results transmission from the server including a searched user profile photograph of a user logged into the mobile app on the searched device, for the searching device to:
      display search results including the searched user profile photograph;
   invitation instructions, subject to user input to the searching device selecting the searched user pictured in the displayed search results, for the searching device to:
      transmit an invitation signal to the server to cause the server to send an invitation notification to the searched user, accessible by the searched user when logged into the mobile app, the invitation notification including a user profile photograph of a searching user logged into the mobile app on the searching device; and
   invitation response instructions, subject to invitation response user input to the searched device prompted by the invitation notification, for the searched device to:
      transmit an invitation response signal to the server to cause the server to send an invitation response to the searching user, indicating a selection by the searched user to accept or refuse the invitation from the searching user.

2. The app of claim 1, wherein the near-field search signal is a Bluetooth® LowEnergy signal.

3. The app of claim 1, said search instructions being subject to user input comprising a search command.

4. The app of claim 1, said search instructions further comprising an instruction for the searching device to repeat periodically said emitting a near-field search signal.

5. The app of claim 1, the search signal further comprising a unique signature of the app; and
   the search response instructions being further subject to the searched device verifying the app signature in the received search signal.

6. The app of claim 1, the instructions to emit the search signal further comprising an instruction to emit the search signal continuously for a predetermined search signal time and to cease emitting the search signal at the end of the search signal time.

7. The app of claim 6, the search signal time being approximately 1 to 2 minutes.

8. The app of claim 1, the invitation notification further including a request by the searching user for a particular type of contact information from the searched user, selected by the searching user from a list of contact information type options displayed on the searching device.

9. The app of claim 1, said invitation response instructions being further subject to the invitation response user input being input into the searched device before the expiration of a predetermined invitation response time limit.

10. The app of claim 9, the mobile app including an interface for said predetermined invitation response time limit to be set by a user selection input to the searching device.

11. An interpersonal introduction system comprising
   a plurality of mobile electronic devices running an interpersonal introduction mobile app stored in a medium readable by the mobile electronic devices; and
   a server storing a plurality of user profiles, each including a user profile photograph;
   the mobile app comprising:
      a profile uploading interface for a user of a mobile electronic device to create and upload a user profile to the server;
      search instructions for a searching mobile electronic device to:
         query the server for a temporary unique searching device code identifying the searching device;
         receive the searching device code from the server; and emit a near-field search signal including the searching device code;

search response instructions, subject to receipt of the near-field search signal, for a nearby searched mobile electronic device running the mobile app to:
transmit a search response signal to the server including a searched profile signature identifying a user profile of a user logged into the mobile app on the searched device and indicating that the searched device received the search signal including the searching device code;

search results display instructions, subject to receipt of a search results transmission from the server including a searched user profile photograph of a user logged into the mobile app on the searched device, for the searching device to:
display search results including the searched user profile photograph;

invitation instructions, subject to user input to the searching device selecting the searched user pictured in the displayed search results, for the searching device to:
transmit an invitation signal to the server to cause the server to send an invitation notification to the searched user, accessible by the searched user when logged into the mobile app, the invitation notification including a user profile photograph of a searching user logged into the mobile app on the searching device; and invitation response instructions, subject to invitation response user input to the searched device prompted by the invitation notification, for the searched device to:
transmit an invitation response signal to the server to cause the server to send an invitation response to the searching user, indicating a selection by the searched user to accept or refuse the invitation from the searching user.

12. The system of claim 11, wherein the near-field search signal is a Bluetooth® LowEnergy signal.

13. The system of claim 11, said search instructions being subject to user input comprising a search command.

14. The system of claim 11, said search instructions further comprising an instruction for the searching device to repeat periodically said emitting a near-field search signal.

15. The system of claim 11, the search signal further comprising a unique signature of the app; and
the search response instructions being further subject to the searched device verifying the app signature in the received search signal.

16. The system of claim 11, the instructions to emit the search signal further comprising an instruction to emit the search signal continuously for a predetermined search signal time and to cease emitting the search signal at the end of the search signal time.

17. The system of claim 16, the search signal time being approximately 1 to 2 minutes.

18. The system of claim 11, the invitation notification further including a request by the searching user for a particular type of contact information from the searched user, selected by the searching user from a list of contact information type options displayed on the searching device.

19. The system of claim 11, said invitation response instructions being further subject to the invitation response user input being input into the searched device before the expiration of a predetermined invitation response time limit.

20. The system of claim 19, the mobile app including an interface for said predetermined invitation response time limit to be set by a user selection input to the searching device.

* * * * *